(12) United States Patent
Larsson

(10) Patent No.: US 6,389,483 B1
(45) Date of Patent: May 14, 2002

(54) SYSTEM AND METHOD FOR REDUCING COUPLING BETWEEN MODULES IN A TELECOMMUNICATIONS ENVIRONMENT

(75) Inventor: Tony Ingemar Larsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 08/975,539

(22) Filed: Nov. 20, 1997

Related U.S. Application Data

(63) Continuation-in-part of application No. 08/723,107, filed on Sep. 30, 1996.
(60) Provisional application No. 60/005,337, filed on Oct. 17, 1995.

(51) Int. Cl.$^7$ .............................. G06F 9/54; G06F 15/17
(52) U.S. Cl. ....................................................... 709/313
(58) Field of Search ................................ 709/300, 303, 709/313, 310, 312, 315

(56) References Cited

U.S. PATENT DOCUMENTS

| | | | |
|---|---|---|---|
| 5,297,285 A | | 3/1994 | Abrahamsson et al. ...... 395/700 |
| 5,339,430 A | * | 8/1994 | Lundin et al. ............... 395/700 |
| 5,386,568 A | * | 1/1995 | Wold et al. .................. 395/700 |
| 5,410,703 A | | 4/1995 | Nilsson et al. ............... 395/700 |
| 5,485,617 A | * | 1/1996 | Stutz et al. .................. 395/700 |

FOREIGN PATENT DOCUMENTS

| | | |
|---|---|---|
| EP | 0 770 957 A2 | 5/1997 |
| EP | 0 770 957 A3 | 3/2000 |
| WO | WO 94/01818 | 1/1994 |
| WO | WO 97/15003 | 4/1997 |
| WO | PCT/SE 98/02073 | 8/1999 |

OTHER PUBLICATIONS

Empirical Evaluation of Software Quality Attributes by Murray Wood, Andrew Brooks, James Miller, and Marc Roper; Empirical Foundations of Computer Science (EFoCS); Department of Computer Science, University of Strathclyde; Jun. 1995, pp. 1–19.

A Software Metric System for Module Coupling by A. Jefferson Offutt, Mary Jean Harrold, and Priyadarshan Kolte; Journal of Systems and Software; vol. 20, No. 3; 1993; Department of Computer Science, Clemson University, Clemson, South Carolina; pp. 295–308.

\* cited by examiner

Primary Examiner—Alvin Oberley
Assistant Examiner—Lewis A. Bullock, Jr.
(74) Attorney, Agent, or Firm—Jenkens & Gilchrist, P.C.

(57) ABSTRACT

A technique for enhancing the modifiability and reuse of telecommunications software systems is described. The problem domain is first partitioned into tasks that are assigned to distinct software program modules. In one embodiment, each of the software modules have multiple output ports. Each output port provides a mechanism to link the software module to a specific version of a different program module. The multiple output ports are used to selectively link the module to one of several versions of a different program module. The linking is performed as early as system design time or as late as run-time, or at any intermediate time between the two. The use of output ports makes software modules less dependent on each other and also simplifies the "hot-swapping" or dynamic replacement of one module by another at run-time. In an alternative embodiment, each of the software modules has a unitary output port where each output port comprises an array of linking records. Each linking record has as many linking variables as there are versions of the receiving module.

24 Claims, 27 Drawing Sheets

SYSTEM AND METHOD FOR REDUCING COUPLING BETWEEN MODULES IN A TELECOMMUNICATIONS ENVIRONMENT

PRIORITY UNDER 35 U.S.C. § 119(e) & 37 C. F.R. § 1.78(a)(1) This Nonprovisional U.S. Patent Application is a continuation in-part of Nonprovisional U.S. patent application, Ser. No. 08/723,107, entitled SYSTEM AND METHOD FOR REDUCING COUPLING IN AN OBJECT-ORIENTED PROGRAMMING ENVIRONMENT, filed on Sep. 30, 1996 which in turn claims priority from Provisional U.S. patent application, Ser. No. 60/005,337, entitled COMPONENT DECOUPLING, A KEY TO IMPROVING SOFTWARE SYSTEM ARCHITECTURES, filed on Oct. 17, 1995 in the name of Tony I. LARSSON, the inventor of the present application. The earlier-filed Nonprovisional Patent Application is currently pending and has not been abandoned.

CROSS REFERENCES TO RELATED APPLICATIONS

This Nonprovisional U.S. Patent Application contains subject matter related to an earlier-filed, currently nonabandoned Nonprovisional U.S. patent application Ser. No. 08/723,107, entitled SYSTEM AND METHOD FOR REDUCING COUPLING IN AN OBJECT-ORIENTED PROGRAMMING ENVIRONMENT, filed on Sep. 30, 1996 which in turn claims priority from Provisional U.S. patent application Ser. No. 60/005,337, entitled COMPONENT DECOUPLING, A KEY TO IMPROVING SOFTWARE SYSTEM ARCHITECTURES, filed on Oct. 17, 1995 in the name of Tony I. LARSSON, the inventor of the present application. This currently pending Nonprovisional U.S. Patent Application and any other related Patent Applications deriving therefrom in the United States or in other countries and the disclosure(s) contained therein are all hereby expressly incorporated by reference herein.

The earlier-filed Provisional U.S. Patent Applications identified above and the present Nonprovisional U.S. Patent Application have all been, will be or are under an obligation of assignment to Telefonaktiebolaget LM Ericsson (publ).

DESCRIPTION

1. Technical Field of the Invention

The invention relates to the field of computer programming languages, methodologies and systems and more particularly, to a system and method for reducing the interdependence between modular software units and facilitating the dynamic replacement or hot-swapping of software modules at run-time in a real-time environment, such as a telecommunications environment.

2. Description of Related Art

This patent application concerns the development and maintenance of large software systems. It has been found desirable to have the ability to extend or modify a system so as to cope with new or changed requirements. It has further been found desirable to find techniques for making such changes both simply and selectively. Consequently, an ideal software development environment should permit much of the software used in an old system to be reused or be combined into a new system with only slight modifications. In some application areas such as the telecommunications, it has also been found desirable that system modifications be possible during run time, i.e., to be made dynamically in a live system. Such dynamic system modification is sometimes referred as "hot-swapping"—a term commonly used in the field of computer hardware.

In order to limit the cascading effect of changes and to simplify the reuse and/or modification of different parts of a large software system, it has become common to partition the software into modules on the basis of some general design principles that offer such benefits. It should be emphasized that ideally the different software modules should be as independent of each other as possible so that a change in one module or the replacement of another does not result in or require changes to a great number of other modules.

The decoupling of software modules (variously referred to in the art as parts, components, objects or processes) is currently solved by a two-step process. First, by requiring that an interface be declared that defines what a module type may provide to other module types, and sometimes also defining the functions and data that a module may use from other modules. Next, such interface information is used to statically link the different modules into a system. This technique can prevent ordinary users of a module from directly using knowledge about the internal implementation of a software module in undesirable ways.

Class 5 telecommunications switches, such as AT&T's 5ESS system or Ericsson's AXE-10 system, comprise complex telecommunication hardware and software. The software architecture of Ericsson's AXE-10 system requires each block or module to have a Signal Sending Table (SST) to decouple it from other blocks or modules. The basic purpose of the Signal Sending Table used in AXE-10 is to provide linking information for signals sent from a module, specifying the receiving module the signals are intended to be sent to. The signals sent are used to trigger the execution of program code implementing the function associated with the signal but are typically not directly linked to the entry position for such code. Instead the linking is done indirectly via a Signal Distribution Table (SDT), for the common input port of the block. The entry position in this SDT is called the Local Signal Number (LSN). One can use a linker to find the LSN of a receiving block and provide this information to the SST of the sending block.

The AXE-10 software architecture also includes support for a concept referred to as "multiple signals" wherein the same signal is sent to multiple receiving blocks and where the receiver that is to act on the signal is specified at run-time. In this case one needs to find the smallest possible LSN that fits all receiving blocks (so as to avoid wasting a large block of memory space for the SDT). This reduces to a difficult optimization problem that should be avoided if possible.

As described in U.S. Pat. Ser. No. 5,297,285 entitled SYSTEM FOR DYNAMICALLY LINKING MODULAR PORTIONS OF COMPUTER SOFTWARE issued to Anders ABRAHAMSSON & Lars HOLMQVIST, one way to improve this software architecture is by complementing the Signal Sending Table and Signal Distribution Table of the various different modules with a Global Signal Distribution Table (GSDT). This simplifies the problems associated with the dynamic linking of software modules. In such a case, the sending block can use a Global Signal Number (GSN) in conjunction with the block number of the receiving block to find the appropriate LSN for that receiving block. FIG. 1 is a diagrammatic representation of the manner in which modular software blocks are dynamically linked in accordance with the system of this Ericsson patent.

The system and method disclosed in the above-identified Ericsson patent can be extended or generalized as to cover the case where a symbolic block number is replaced by an actual block number. More details about this technique can be obtained by reference to this U.S. Pat. Ser. No. 5,297,285.

Another U.S. Pat. Ser. No. 5,339,430 entitled SYSTEM FOR DYNAMIC RUN-TIME BINDING OF SOFTWARE MODULES IN A COMPUTER SYSTEM issued to Kenneth LUNDIN & Ulf MARKSTRÖM describes a technique for object decoupling and dynamic relinking of object-oriented software modules using abstract language-independent interface specifications supported by compilation techniques and an address trader (which is functionally equivalent to a global address table) that is built into the kernel of the operating system.

Yet another U.S. Pat. Ser. No. 5,410,703, entitled SYSTEM FOR CHANGING SOFTWARE DURING COMPUTER OPERATION issued to Rickard NILSSON, Ulf MARKSTRÖM & Leif KLÖFVER describes the use of an addressing mechanism that allows two references, one to an old module or object and the other to a new module or object. This patent also describes a mechanism for relating and maintaining the state of both an old as well as a new module during the updating phase in an object-oriented system. FIG. 2 is a flow chart illustrating the process of changing software during run-time in accordance with the system of this Ericsson patent. However, it should be noted that the term "module" as used in this reference appears to refer to a software reload unit or replacement unit, and has thus a somewhat different meaning from the term as used in the present patent application.

In theory, program entities invoking a module (which may be other modules) can be restricted from straying beyond a defined interface and from using knowledge about the implementation of a module. However, different modules are often designed by software engineers who have knowledge about the existence and internal architecture of other related modules. They may use their information in ways that can make future changes to the system complex.

There is a fundamental conflict in designing modular software systems. On the one hand, one would like to modularize the design of complex software systems by partitioning the application domain and then using the set of software modules as building blocks in crafting a solution. This requires that the various software modules complement each other and work well in combination.

On the other hand, it is also desirable to provide each module with the least amount of information about the internal implementational details of other modules. While it is important to provide each module with abstract or essential knowledge about other software modules in order to permit a module to make use of other modules, it is also desirable to restrict access to detailed internal information about a module (e.g., address information regarding a specific instance of a module type) from other modules.

Current approaches for addressing this problem have principally concentrated on techniques for encapsulating and protecting the module internals. However, these approaches do not prevent inter-dependencies between modules from arising, which in turn may make system changes difficult to implement without the modification of multiple modules. Thus there is a need for techniques that can help decouple modules by restricting use of knowledge about other modules other than that specified in an interface definition. As noted earlier, this issue has been partially addressed by U.S. Pat. Ser. Nos. 5,297,285 & 5,339,430 identified above, albeit by techniques that are different from those described and discussed herein.

There is also a need for software programming environments that support dynamic modifications to or configuration changes of software systems using new or modified modules while the system is running. As noted earlier, this issue has been partially addressed in U.S. Pat. Ser. No. 5,410,703 identified above, albeit again by different methods than those described and discussed herein.

Since telecommunications systems are expected to not have any downtime, on-going calls or other similar services need to be continuously kept operational. As a result, the transition from an old software system to a new one cannot be instantaneous. Consequently, linking mechanisms are needed to relate the software to both ongoing (or old) calls as well as to new calls (or services that may be separated into different parts). Furthermore, some information needs to be maintained and updated in both the old as well as the new software parts during the relinking process. In some instances, it may be desirable to divide this relinking process into multiple phases.

Traditional Telecommunication Software Development:

The traditional approach to telecommunication software development has been function-oriented. The function-oriented analysis was (and is) based on a top-down (or black box) view of system requirements. In real-time applications such as telecommunications, such an analysis focuses on the functions or services provided to external clients and is implemented as processes that are distributed over a telecommunications network.

In contrast, software engineers often focus on algorithm control structures, on data structures and on data transformation methods. In the function-oriented approach, as understood by skilled software engineers, data is usually considered as being global, although in some instances data maybe encapsulated. Consequently every change in the representational format of a datum immediately feeds back into the design of every function that manipulates that datum.

This disadvantage can be ameliorated somewhat, by manipulating the data indirectly, i.e., by manipulating the data symbolically or by using a specialized interface function that serves as a filter. The use of such interface functions can also permit modification of the representational format of the data and can be used to obtain an abstract view of the data. Thus, choice of a proper software architecture model can avoid or eliminate many of the problems that are often associated with the function-oriented approach to software design.

The function-oriented approach is most commonly used nowadays to manipulate information contained in databases. Each database management software program often uses an abstract information model that isolates the data representation from its manipulation. However, the internal structure of the database is not accessible to an end-user who invokes standard functions to manipulate the information contained in the database.

In contrast to the function-oriented approach which focuses on functions that transform or manipulate external or global data, the object-oriented approach advocates an inverted, more structure-oriented or implementation-oriented view of the world, that focuses on objects that in turn are represented by data and applicable functions. This approach, which is achieved by separating the function-naming parts of messages (including their intended interpretation) from the implementations of the functions, makes it possible to encapsulate and hide the data representations that are used in a specific implementation. Thus, this approach requires both the message-names as well as their meaning (which constitute the communications means between objects) to have stable definitions.

The encapsulation of certain information in distinct system entities that communicate amongst each other through signals has been a common approach amongst many telecommunications software designers and programmers. This approach has been used in order to handle system components in a coherent way that is independent of their physical location and implementation. In this telecommunications software engineering paradigm, a function at the system-level is implemented by the interworking of different system components each containing some of the necessary parts of the function being implemented, including the related data.

More details about the use of object-oriented approaches to developing software for telecommunications applications can be found in U.S. patent application Ser. No. 08/723,107, entitled SYSTEM AND METHOD FOR REDUCING COUPLING IN AN OBJECT-ORIENTED PROGRAMMING ENVIRONMENT.

The current object-oriented paradigm suffers from several problems. The first of these is the likelihood of excessive coupling between objects. Such excessive coupling often arises due to direct references by some objects to other serving objects via messages as well as via class structures and/or object structures. Another problem with the present paradigm is the lack of a deterministic solution for minimizing the amount of coupling between objects and/or subsystems and the lack of a suitable decomposition technique for the same purpose.

It should be emphasized that much of the issues detailed below relative to the problems of traditional (single-port) object-oriented software design are equally applicable to modular software development. Thus, for example, many of the problems reportedly associated with the use of present object-oriented software development techniques may be attributable to the use of objects having only a single (input) port. As detailed in U.S. patent application Ser. No. 08/723, 107, entitled SYSTEM AND METHOD FOR REDUCING COUPLING IN AN OBJECT-ORIENTED PROGRAMMING ENVIRONMENT, the current object-oriented programming paradigm may be improved upon by using objects that have both an input port as well as an output port. Similar problem have also been observed with modular software development. Those of ordinary skill in the art would understand that an "object" is a lower-level programming construct than a "module."

A central problem with the present object-oriented paradigm is that objects are well-protected only from external misuse. Currently some measure of decoupling can be achieved by using a message dispatch function that works as an input port for each object as shown in FIG. 3. As noted earlier, it may be possible to extend this technique from the object-level to the module-level.

FIG. 3 shows an object $o_1$ 300 having an input port $p_1$, 301 and containing two functions (or methods) $f_1$ 311 and $f_2$ 312 that modify, manipulate, or transform two attribute values, $v_1$ 321 and $v_2$ 322. The role of the input port $p_1$ 301 is to decouple the accesses (or invocations) of the functions $f_1$ 311 and $f_2$ 312 from their implementations by using an externally published function-name in the invoking message.

Thus the input port $p_1$ 301 serves as an attribute-value or function-name dispatch function. However, this technique of decoupling does not prevent problems arising from an object being dependent on other objects that it invokes. Thus, changes to object $o_1$ 300 may influence all other objects invoked by it since each object is often linked to many other objects as shown in FIG. 4.

FIG. 4 illustrates the strong coupling between objects that arise from message links between various objects. Four objects $o_1$ 401, $o_2$ 402, $o_3$ 403 and $o_4$ 404 are shown in FIG. 4. Thus, the invocations of object $o_1$ 401 may cause its functions $f_{11}$ 411, $f_{12}$ 412 and $f_{13}$ 413 to invoke in turn objects $o_2$ 402, $o_3$ 403 and $o_4$ 404 as shown in the figure. Likewise, the invocation of object $o_2$ 402 causes its functions $f_{21}$ 421 and $f_{22}$ 422 to invoke inter alia, object $o_4$ 404. Likewise the invocation of object $o_3$ 403 causes its functions $f_{31}$ 431, $f_{32}$ 432 and $f_{33}$ 433 to invoke inter alia, object $o_4$ 404.

Analogously, as shown in FIG. 4, the invocation of object $o_4$ 404 causes its functions $f_{41}$ 441 and $f_{42}$ 442 to invoke objects $o_2$ 402 and $o_3$ 403. Thus changes in the internal structure of object $o_1$ 401 will impact upon the operation of objects $o_2$ 402, $o_3$ 403 and $o_4$ 404.

It has been found that strong coupling between modules lacking an output port poses the same kind of problem. This illustrates an important structuring guideline that can be used to decrease the coupling between objects/modules and improve the operation of object-oriented or modular software programs, namely, that it is important to isolate elements that change frequently from other elements that remain relatively stable over long periods of time.

As can be seen from the above description, current attempts to standardize the design and development of computer software have focused only on high-level standardization efforts. However, in order to provide a design base that can respond to market needs and economic constraints, software systems and their components need to be flexible and reusable. Consequently, it has been found desirable that software architectures support interoperability, modifiability and implementation-independence over long periods of time.

A good system architecture therefore needs to be based on a definitive conceptual design that incorporates knowledge about the requirements that will be imposed upon the system. Consequently, important elements of the architecture including paradigms, interfaces, naming rules, messaging schemes, addressing schemes, key components, structure, layers, function decomposition principles, design rules and support tools must be selected in advance in such a manner as to maximize their consistency, simplicity, uniformity and orthogonality.

Piece-meal improvement of an existing architecture cannot always suffice, as an existing architecture may lack a consistent architecture or framework of system interfaces; different applications might be incompatible; industry standards might not have been adhered to; or the accumulated sum of new customer requirements might necessitate the design and development of a new software architecture model.

In order to improve the architecture of a software system, one first needs to understand the problems that arise from the present object-oriented paradigm. Knowledge of the underlying problems can help make new designs more modifiable, inter-operable and implementation-independent.

SUMMARY OF THE INVENTION

Therefore it is a primary object of the present invention to permit the decoupling amongst the software modules in a telecommunications environment. It is a further object of the present invention to permit the easy and dynamic updating of software modules in a running system.

A system and method for reducing the coupling between modules of a software application program in a modular telecommunications software programing environment is described. The programming environment comprises a computer system containing a processing unit, a memory unit, an I/O (input/output) unit and an operating system.

In one aspect of the present invention, the technique starts with the creation of functionally-distinct software program modules. When a software module is revised to add new features, both versions of the software module are stored. Each of the modules that use the services of other modules has at least two logical output ports, with each of the two logical output ports serving to route data to the appropriate version of the other module.

It should be noted that the set of two or more logical output ports may be implemented as a single physical output port. Further, the various output ports could be masked to appear as a unitary symbolic destination port to a system programmer. A selected group of two or more modules is linked into a telecommunications application program. The software application program is executed on the computer system, by processing all invocations of non-local references in each module through the appropriate output port of the module.

In another aspect of the present invention, a method for facilitating the reuse of modular software units is described. The technique begins with the grouping of software modules of the telecommunications application program into Access Modules, Service Modules and Resource Modules. Access Modules are responsible for managing the Access Individuals while Service Modules are responsible for managing the Service Individuals. Likewise, the Resource Module is responsible for managing the Resource Individuals.

A select group of modules that may be combined into a telecommunications application program are next identified. Each module that invokes other modules is provided with specific address information about the other modules no earlier than system building time, creating corresponding module instances. The instances of the selected group of modules are then lined into a telecommunications software application program. The software application program is then executed on the computer system, by processing all invocations of non-local references in a module through the Access Module.

In yet another aspect of the present invention, a system and method for the selective replacement, testing and activation of modular software units in a telecommunications application program is described. The technique begins with the creation of functionally-distinct software program modules. When a software module is revised to add new features, both versions of the software module are stored. Each of the modules that use the services of other modules has at least two logical output ports, with—each output port serving to route data to the appropriate version of the other module.

The software modules of the telecommunications application program are then grouped into Access Modules, Service Modules and Resource Modules. Access Modules are responsible for managing the Access Individuals while Service Modules are responsible for managing the Service Individuals. Likewise, the Resource Module is responsible for managing the Resource Individuals.

Each new service need identified by an Access Module is assigned a unique Service Identity (SI). A globally unique Selection Variable (SV) is then specified to indicate when the telecommunications application program is to make the transition from using the first version of the second module to using the second version of the second module. The Service Identity is then compared with the Selection Variable. If the Service Identity is greater than or equal to the Selection Variable, the modules of the telecommunications application program are relinked by replacing references to the first version of the second module with references to the second version of the second module. The software application program is then executed on the computer system.

BRIEF DESCRIPTION OF THE DRAWINGS

A more complete understanding of the method and system of the present invention may be obtained by reference of the detailed description of the preferred embodiments that follow, taken in conjunction with the accompanying drawings, wherein.

DESCRIPTION OF THE PREFERRED EMBODIMENT

Module Orientation

Figure 1:
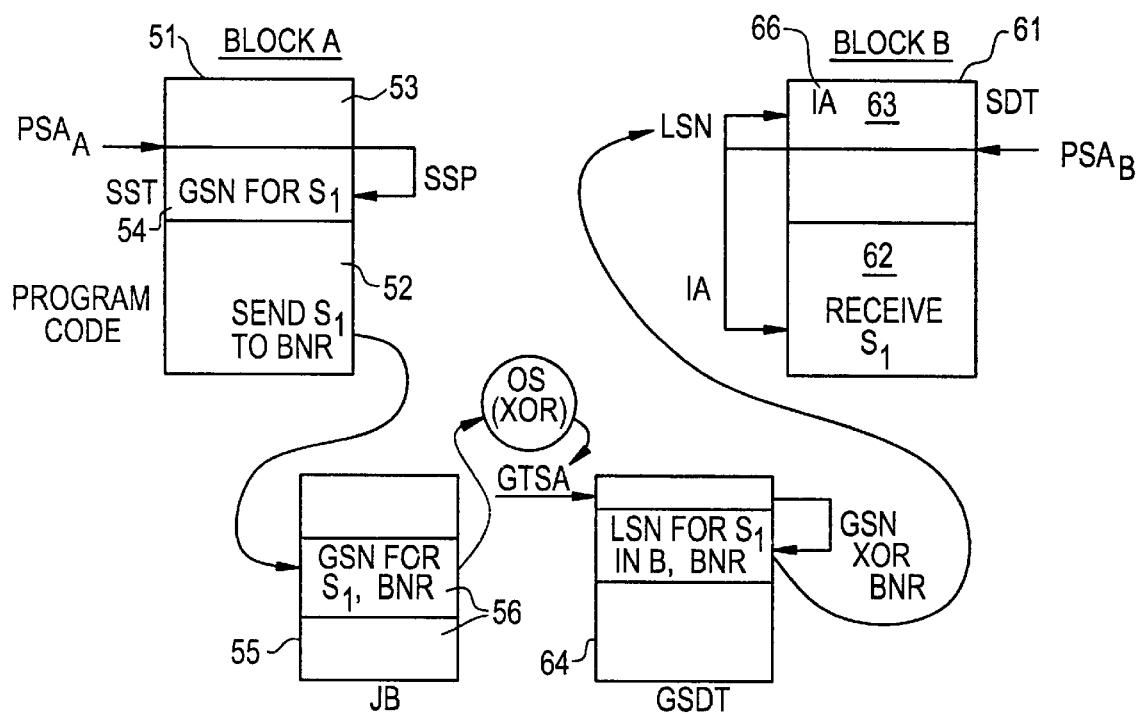
FIG. 1 is a diagrammatic representation of the manner in which modular software blocks can be dynamically linked in accordance with the system as described in a prior patent.
Figure 2:
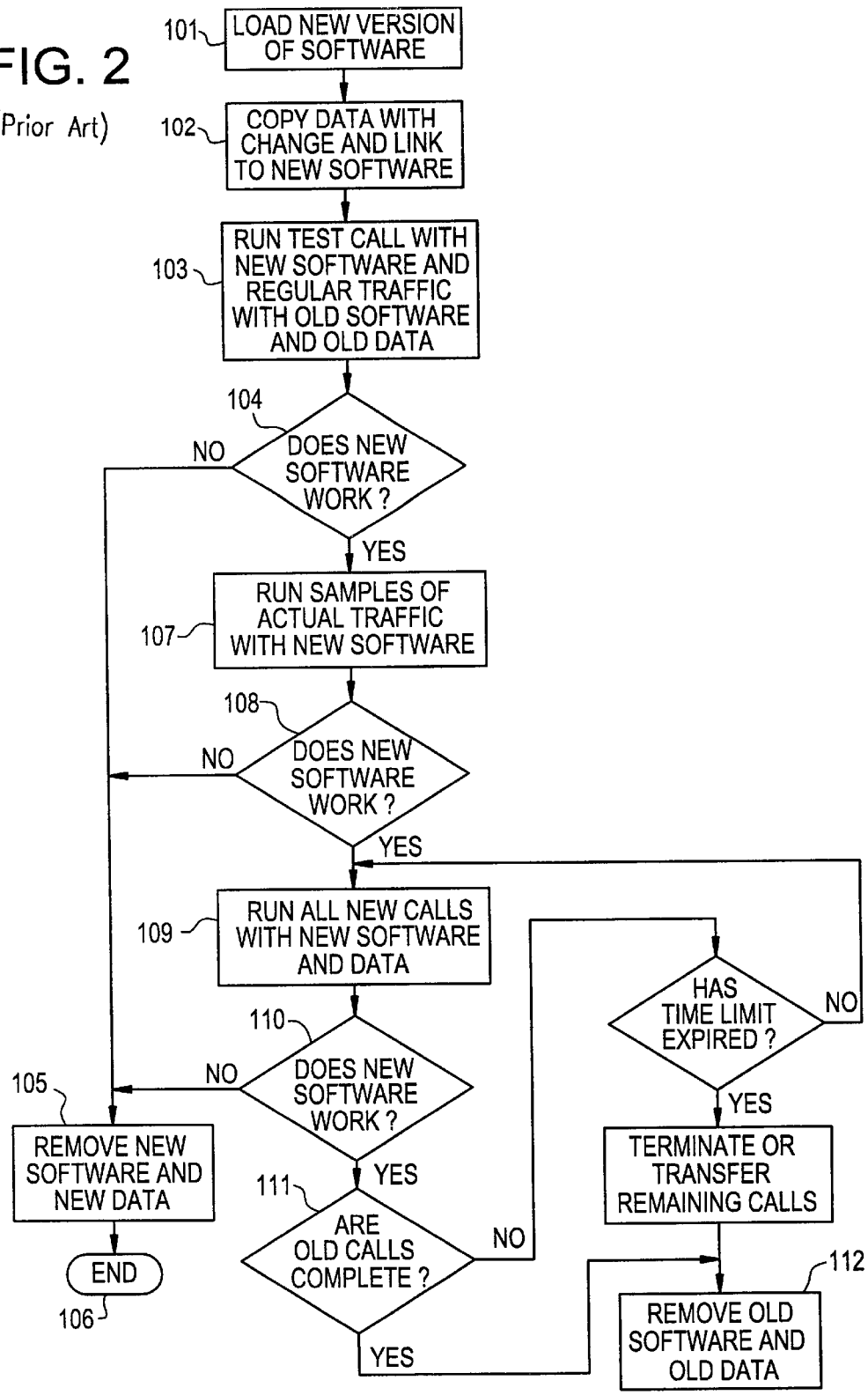
FIG. 2 is a flow chart illustrating the process of changing software during run-time in accordance with the system as described in a prior patent.
Figure 3:
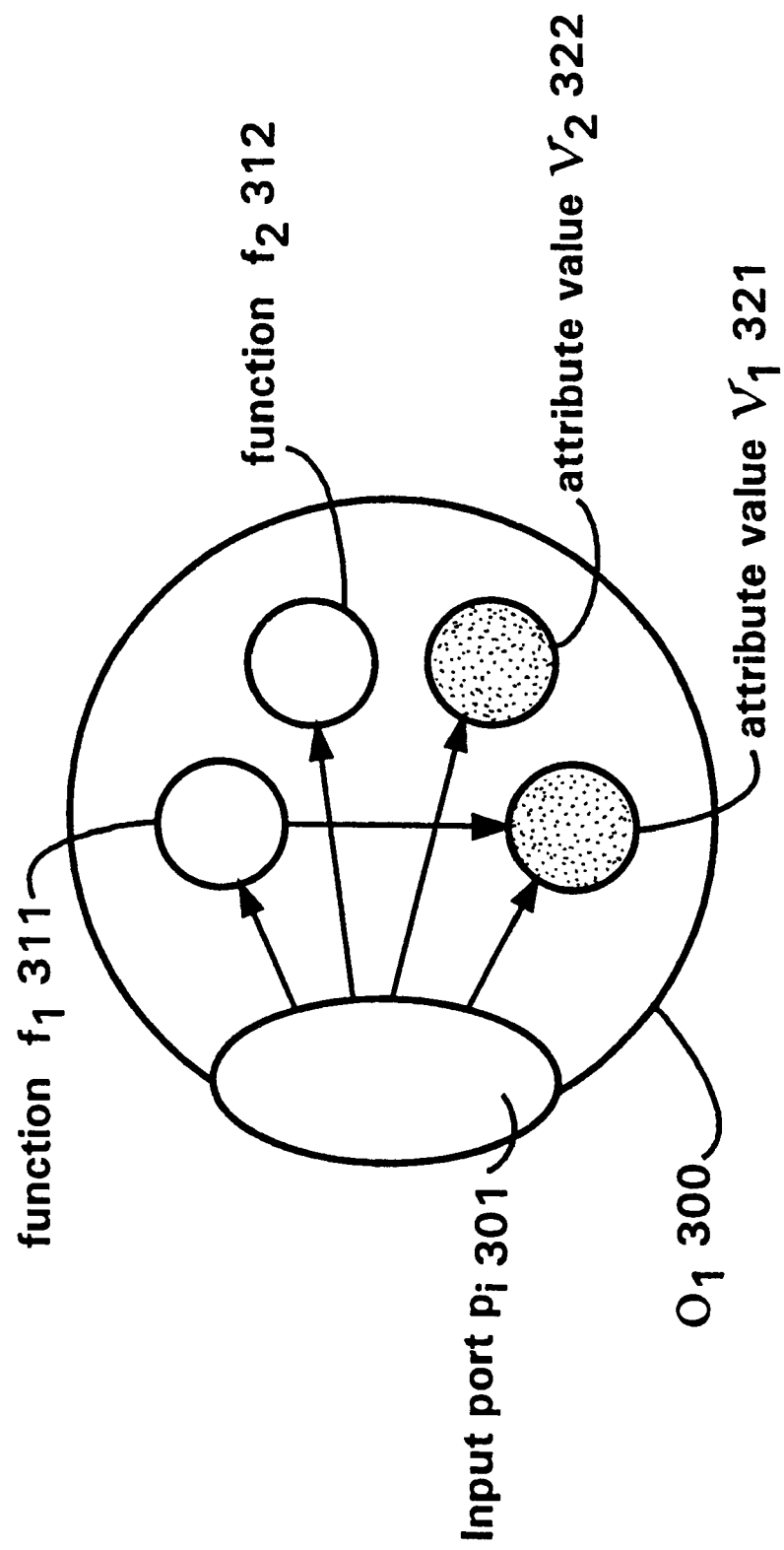
FIG. 3 shows an exemplary embodiment of the traditional object-oriented paradigm where each object has an input port that functions as a message dispatch function.
Figure 4:
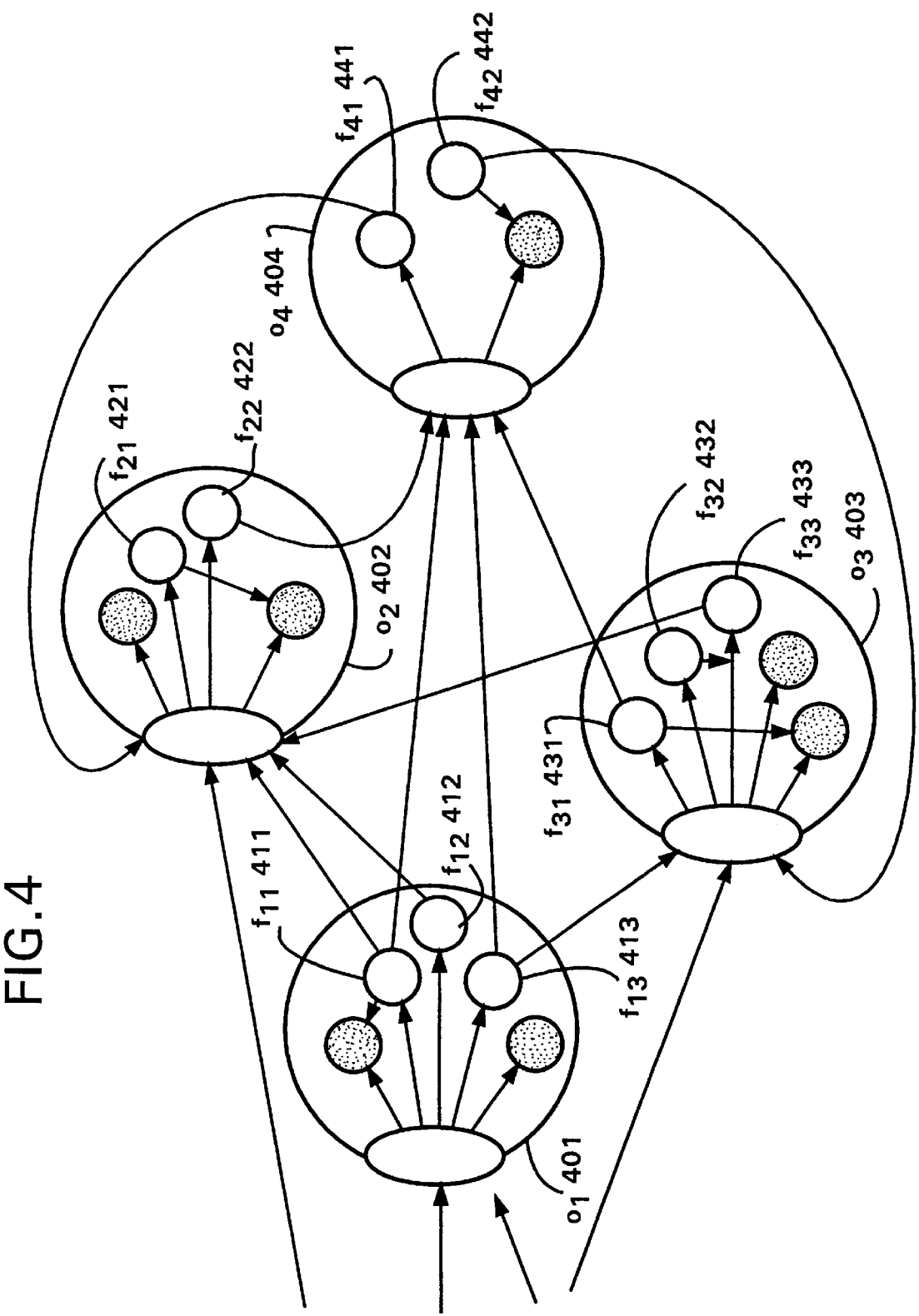
FIG. 4 illustrates the strong coupling between objects (or modules) that can arise from the message links between various objects (or modules) in a system.

A software system comprises a set of modules that cooperate to achieve a common goal or effect. In many instances, the modules of a software system are themselves systems. Consequently, in describing or modeling a product, it has been found to be very useful if one were able to switch between a module-oriented and a system-oriented perspective.

In a module-oriented analysis, a software-system is viewed top-down as being a single module from a functional perspective and viewed bottom-up as being a set of coupled (and sometimes physically distributed) modules. In the system-oriented approach, each module may itself be a system at a lower-level. In such an analysis, communication between modules is permitted only through predefined interfaces, couplings, communications channels or ports.

The first task in a module-oriented analysis is therefore to identify the users of each module in order to understand the greatest use of the module being analyzed and its overall behavior. Additionally, one needs to determine whether clients invoking a module need access ports to that module or to other modules or systems. The next task in the analysis is to identify one or more possible implementations of each module and to determine the individual behavior of each module and its coupling with other modules. Such an analysis can be helpful in the design of entirely new systems, in the modification of existing systems or permit the reuse of modules in a concurrent software engineering environment.

In one embodiment of the invention described in U.S. patent application Ser. No. 08/723,107 and shown in FIG. 8 and the accompanying description, each object is encapsulated and is permitted to access or communicate with other objects only through established input and output ports. Such a pure module-oriented software engineering approach differs from the traditional object-oriented approach in having an output port to regulate all outward-directed communications from an object. This additional regulation and protection of outward-directed communications need not be "hard-wired" into each object or module, but can instead be implemented using additional software constructs as detailed elsewhere in this patent application.

Such an approach ameliorates some of the disadvantages of the existing object-oriented approach by reducing the coupling between modules. The object-oriented approach has been claimed to permit the design of "software ICs" (Integrated Circuits), see, e.g., BRAD J. COX, OBJECT-ORIENTED PROGRAMMING: AN EVOLUTIONARY APPROACH 70–71 (ISBN 0-201-10393-1, Addison-Wesley 1986). However, in practice it has been found that any such software ICs realized using the existing object-oriented software programming paradigm are too dependent upon other objects because it has been tailored for a specific environment. Consequently, in order to obtain reusable modules, one has to aim for more generic solutions to software design problems.

The decoupling of software modules or elements by the use of objects having output ports is one of the basic building blocks of the module-oriented paradigm. Additional details about the use of objects having an output port can be obtained by reference to co-pending U.S. patent application Ser. No. 08/723,107. This technique improves upon, and complements, the current object-oriented software programming paradigm.

Figure 8:
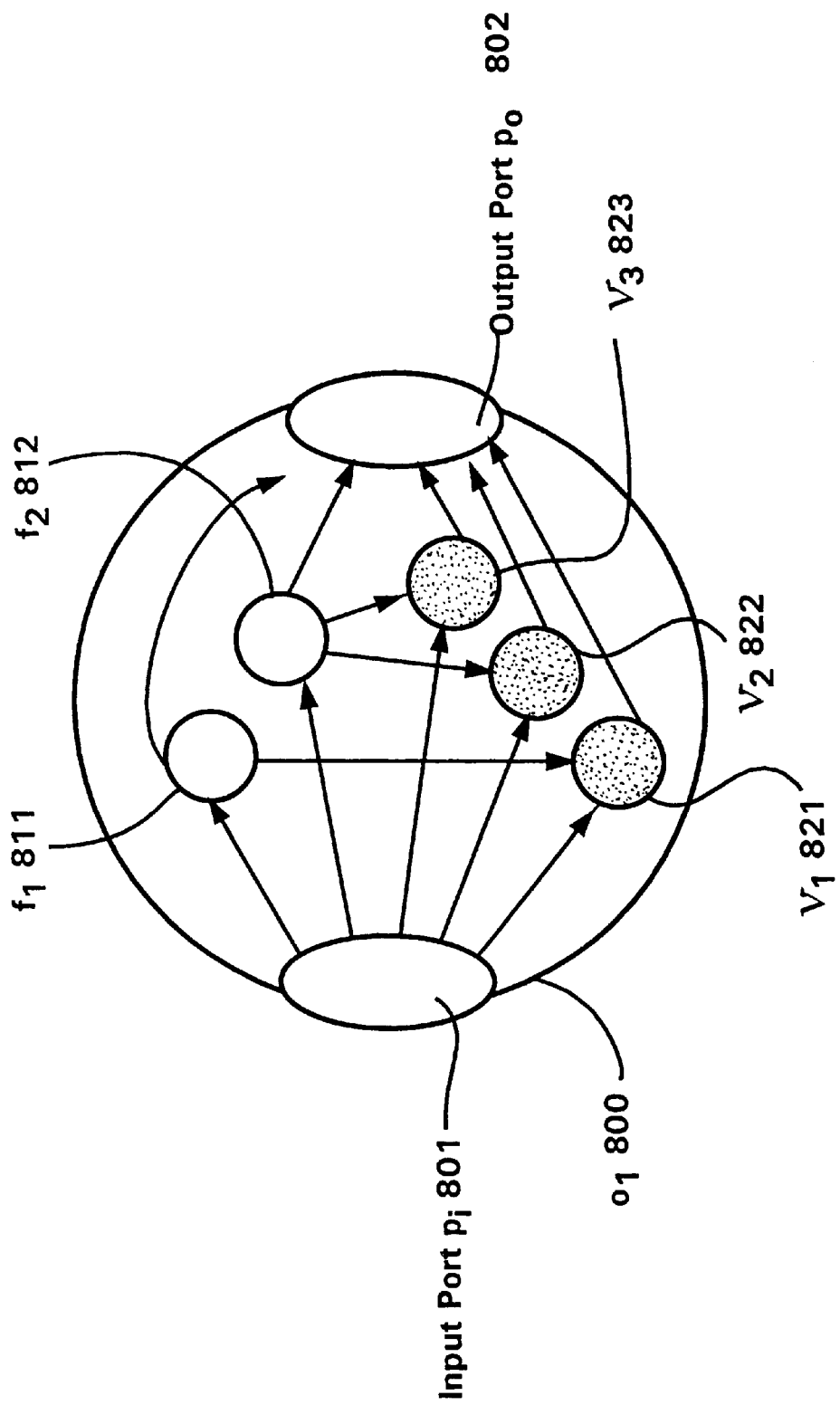
FIG. 8 shows the preferred embodiment of the present invention where every object or module has both an input port as well as an output port.

In the preferred embodiment of the invention shown in FIG. 8 and the accompanying description, the decoupling of objects and modules using output ports is implemented by introducing specific decoupling objects or modules whose role is to act as output ports or name switches. This is detailed elsewhere in the patent application. When a decoupling object or module receives a message m, it redistributes the message m to one or more coupled receivers.

In one implementation of the present invention, if we assume that there is one output port for every abstract server object or module, the decoupling object triggers an action of the form "on receiving any message m send message m to receivers $r_{c1}, r_{c2}, \ldots r_{cn}$, where $r_{c1}, r_{c2}, \ldots r_{cn}$" are the names of receiving objects or modules for the specified message. In another implementation of the present invention, a single output port is used, whose behavior can be characterized as "on receiving a message m to an abstract receiver $r_{ai}$, send message m to receivers $r_{c1}, r_{c2}, \ldots r_{cn}$".

However, it should be noted that just by using a decoupling object or module we cannot solve all of the problems that plague the present object-oriented software programming paradigm. For example, the use of decoupling objects or modules does not prevent objects or modules from communicating directly with other objects or modules even where such communications are prohibited by a software programming standard such as the one proposed here.

If full module generality and reusability is to be achieved then the coupling information must not be built in to the various modules but must instead be provided by coupling ports either at the time of instantiation, or (dynamically) during active invocation (or use) of the module.

Further, the partitioning of a software system into modules or subsystems needs to be based upon a rigorous analysis of the static and dynamic couplings between the modules involved, i.e., between the types and the instances of different variables. Other important factors that may also influence the system partitioning include the physical and performance-related locational and distribution constraints.

In order to have practical utility in real-time applications, the module-oriented software programming technique described in the present patent application additionally needs to permit each object or module to simultaneously observe and change the states of other objects or modules. Further, each object or module must also include means for specifying the synchronous activation of multiple objects or modules for the performance of concurrent actions. Without such a capability, the act of observation of an object or module may itself influence the states of other objects or modules—making it impossible to observe either a system's state or its change of state.

It should be noted that there are no significant barriers in the object-oriented paradigm that prevent or limit the inclusion of mechanisms to specify either real-time or simulated real-time behavior. The addition of features for the specification of reactive concurrent behavior can result in an upgraded object-oriented paradigm that better supports the design of open systems.

However, it should also be noted that most object-oriented programming languages and environments of the present day are sequential or single-threaded and thus have no built-in support for handling real-time phenomena like concurrent actions or processes. Consequently, operating system-level mechanisms are necessary for achieving an equivalent effect.

Improving Object Decoupling

U.S. patent application Ser. No. 08/723,107 describes several techniques to limit the problems associated with the traditional object-oriented programming approach. The solutions suggested in this patent application generally fall into two classes.

The first class of solutions can be characterized as methods that support the definition of stable object- and function-partitions that result in the meaning and encoding of messages remaining stable over relatively long periods of time. These methods comprise various techniques for efficient partitioning of the problem space to improve programming efficiency. The second class of solutions regulate the identification of objects and communication between an object and other objects, by introducing a mechanism that adds an extra level of indirectness to inter-object communications. These implementational techniques are also useful for improving programming efficiency.

Object Classification: It is very important to find stable object classes. Several methods of analysis can be used for this purpose. As part of such an analysis, the attributes and functions that characterize each object class and the relationships between various objects need to be defined. In one embodiment of the invention described in U.S. patent application Ser. No. 08/723,107, a hierarchical approach is used to limit the number of objects in view at each level of the hierarchy.

Minimizing the Object-Attribute-Function Space: In another embodiment of the invention described in U.S. patent application, Ser. No. 08/723,107, which belongs to the first class of solutions of improving object decoupling messages are used as interfaces for functions and attributes. Each such interface consists of a function name and an optional set of attribute value pairs. If an analysis of an application domain yields a normal stable set of object classes that are characterized by a reasonably orthogonal set of attributes and functions, it becomes possible to define both the meaning of a set of messages as well as a message-encoding technique that is both stable and extensible.

It has been found in practice that an analysis of one or more object classes will often show a set of closely related functions to have common or shared elements in their meanings. Consequently, the set of messages used can be significantly smaller than the total set of functions using the messages. A similar analysis technique can also be applied to the attribute name space. Furthermore, it may also be possible to unify two or more of the object classes using a similar ordering technique.

Figure 5:
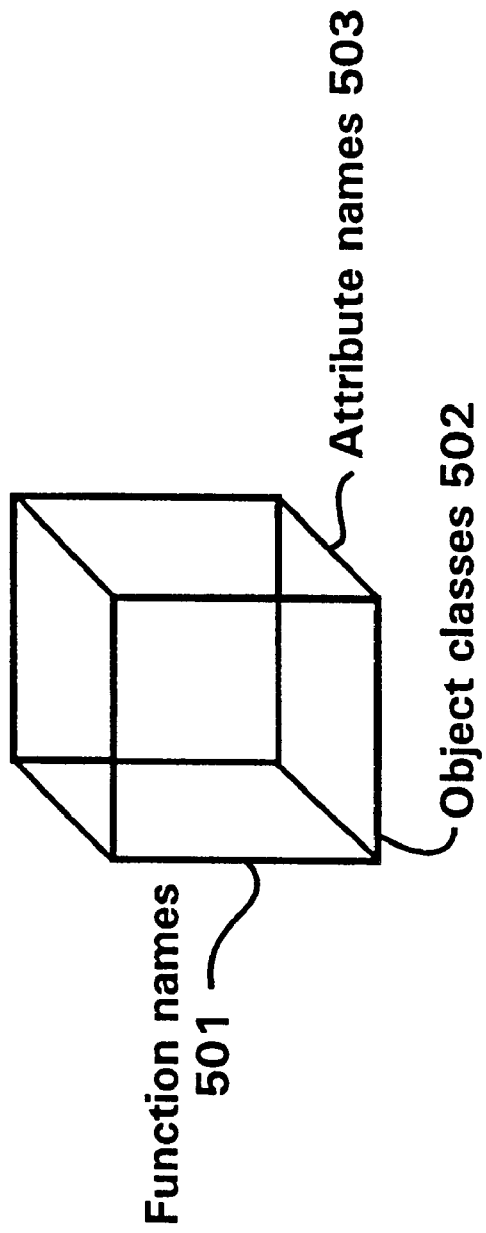
FIG. 5 depicts the object-attribute-function space in three-dimensions.

As shown in FIG. 5 this minimization effort can be visualized as attempting to reduce the volume of a three-dimensional space whose axes represent function names 501, object classes 502 and attribute names 503. Needless to say, the minimization effort must still generate a feasible solution, i.e. the solution must lie within the minimized object-attribute-function solution space. As would be appreciated by those skilled in the art, the extension of this concept to the problems of modular software development transforms to the two-dimensional problem of minimizing the area of the rectangle whose sides are parallel to the function name and the attribute name axes. In the module-oriented approach, the attributes would be the named data items.

Communication Using a Centralized Switch Object: In yet another embodiment of the invention described in U.S. patent application Ser. No. 08/723,107, the desired object- and module-decoupling is obtained by routing communications between peer objects or modules (or between client objects/modules and server objects/modules) through a specialized object or module that operates as a centralized switch. This technique which falls into the second class of problem solutions is an alternative to the preferred embodiment using objects having output ports that is described elsewhere in that application. However it should be noted that it is possible to use the centralized switch object concept in conjunction with the output port concept that is part of the preferred embodiment of the invention described in the earlier-filed co-pending U.S. patent application Ser. No. 08/723,107.

Figure 6:
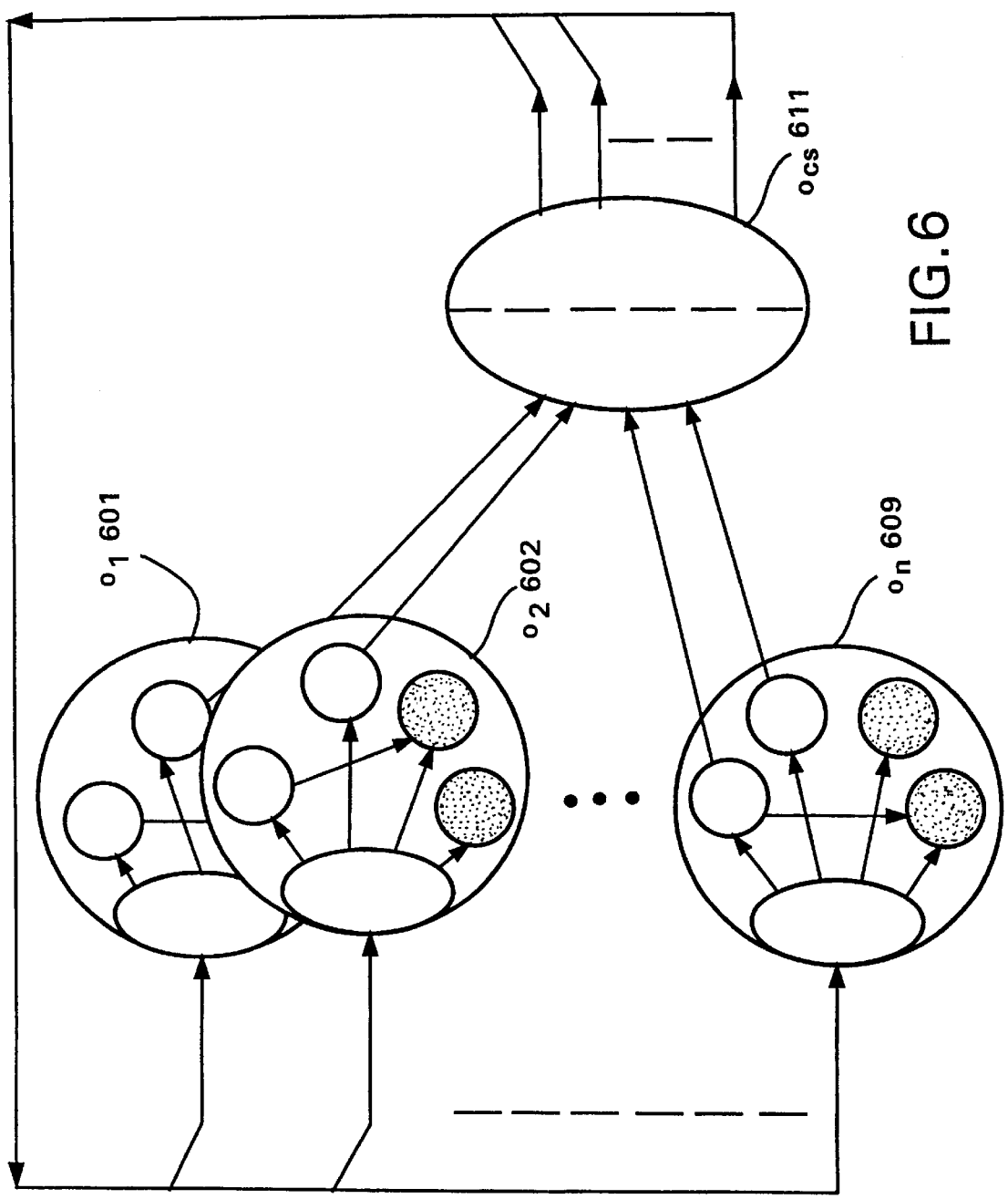
FIG. 6 depicts one technique for reducing coupling between objects or modules by routing all communications between peer objects through a centralized switch object.

Such a centralized switch object or module can be implemented as a dispatch function or as a name table. As shown in FIG. 6, in such a software programming environment, objects or modules $o_1$ 601, $o_2$ 602 $\ldots o_n$ 609 communicate amongst each other and with the external environment through the centralized switch object or module $o_{cs}$ 611.

Communication and Coordination Using an Agent: In a further embodiment of the invention described in U.S. patent application Ser. No. 08/723,107 that also falls into the second class of problem solutions, the centralized switch object described above (or module) can be further enhanced by using an agent object or module $o_a$ 701, also referred to as an interface object or module, that provides the dispatch function and also acts as a controller, command mediator and coordinator of a set of related servers or resources $o_{s1}$ 711, $o_{s2}$ 712, . . . $o_{sn}$ 719 as shown in FIG. 7.

The agent object or module technique is also an alternative approach to the preferred embodiment of U.S. patent application Ser. No. 08/723,107 that discloses objects having output ports. However, as with the centralized switch object or module, it should be noted that it is possible to use the agent object or module concept in conjunction with the output port concept that is part of the preferred embodiment of the present invention.

Figure 7:
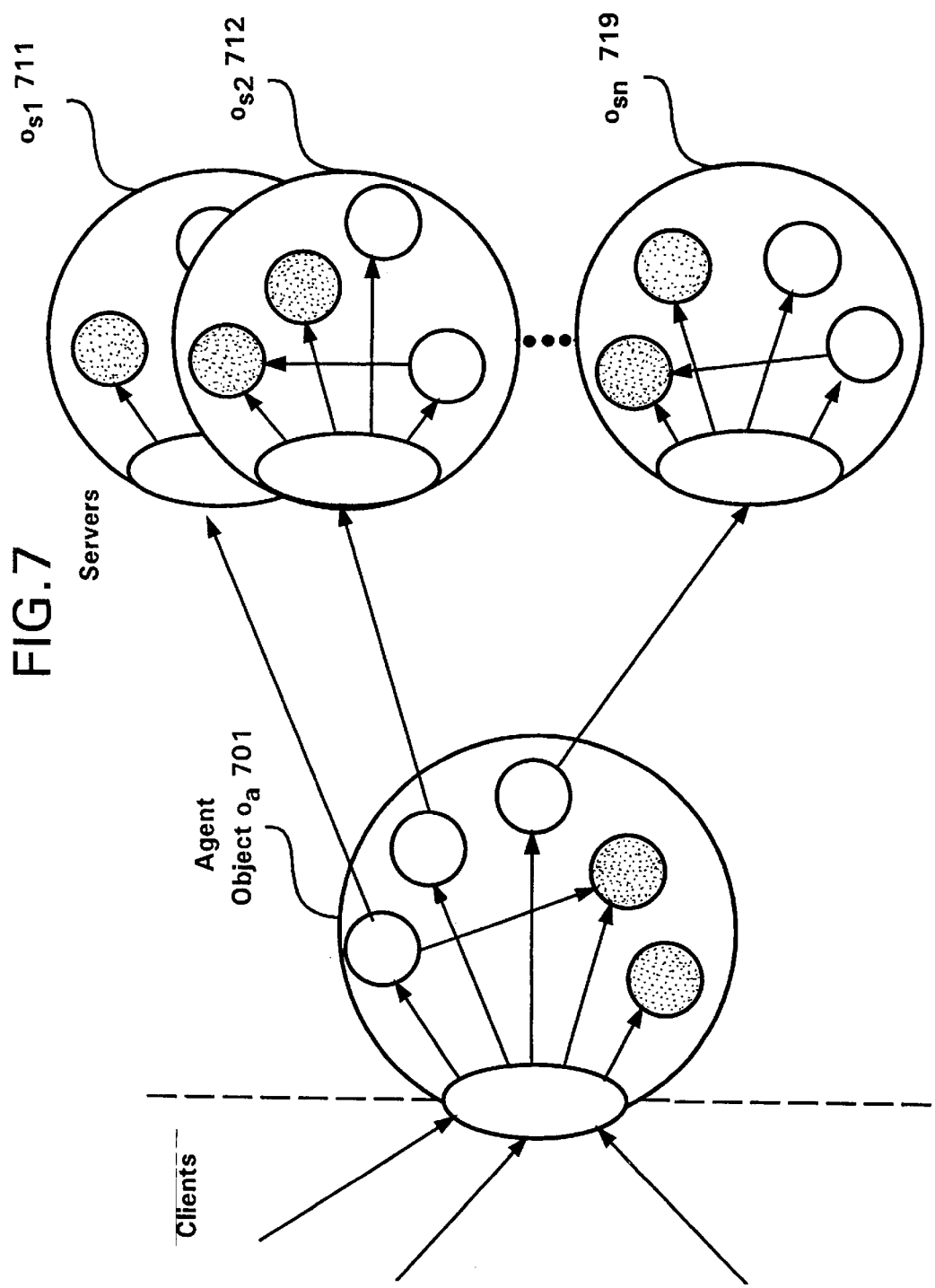
FIG. 7 depicts an exemplary embodiment of the present invention where an interface object or module coordinates communications between server objects or modules.

The principal difference between the basic central switch object (or module) $o_{cs}$ 611 shown in FIG. 6 and the agent object (or module) $o_a$ 701 shown in FIG. 7 is that an agent object or module $o_a$ 701 can bring additional intelligence to the basic access functions that are implemented in the agent object (or module) and can thus be used to provide virtual views of each of the server objects or modules 711–719. It should be noted that the functionality of the centralized switch object or module 611 and the agent object or module 701 are somewhat complementary to each other and can thus be combined in a further embodiment of the invention described in U.S. patent application Ser. No. 08/723,107.

Communication Using an Output Port: In the preferred embodiment of the invention described in U.S. patent application Ser. No. 08/723,107, the coupling between objects is reduced by introducing an enhanced object that possesses an output port in addition to the input port that is part of the traditional object-oriented paradigm. Such an output port (or output dispatch function) decouples the direct access to serving objects by functions or methods within the invoking object. As noted earlier, the output port concept can be extended to cover both objects as well as software modules.

FIG. 8 shows an object (or module) $o_1$ 800 having both an input port $p_i$ 801 and an output port $p_o$ 802. The input port $p_i$ 801 serves as an attribute value or function name dispatcher while the output port $p_o$ 802 functions as an object-name (or module-name) dispatcher. When the object (or module) $o_1$ 800 shown in FIG. 8 receives a message, its input port $p_i$ 801 will either invoke one or both of the two functions $f_1$ 811 and $f_2$ 812 that are defined within the object (or module), or it will directly access the three attribute values $v_1$ 821, $v_2$ 822 or $v_3$ 823 that are defined within the object (or module). The functions $f_1$ 811 and $f_2$ 812 may also access or modify the attribute values $v_1$ 821, $v_2$ 822 or $v_3$ 823. However, neither of the functions $f_1$ 811 or $f_2$ 812 is permitted to invoke an external function or object (or module) directly. Functions $f_1$ 811 and $f_2$ 812 may access or communicate with external functions, objects (or modules) only through the output port $p_o$ 802.

In order to implement this technique, in one embodiment of the invention described in U.S. patent application Ser. No. 08/723,107, every object (or module) referred to by another object (or module) is handled as a variable and is replaced by specific references to instantiated objects (or modules) either at compile-time or at run-time by an instruction of the form:

object {receiver$_1$=object$_1$, . . . , receivers$_n$=object$_n$}

This expression symbolizes an object (or module) that is instantiated in an environment where the variable symbol "receiver$_1$" is to be interpreted as a reference to "object$_1$", etc. The references to instantiated objects (or modules) may be bound at run-time rather than at compile-time if the implementation language supports dynamic binding. Further, the object/module name dispatch function may also be viewed and realized as a table.

Furthermore, if all references from an object (or module) to other serving objects (or modules) are made indirectly using an "environment dictionary" or table (that can be implemented and treated as an attribute of the object or module) that is evaluated at run-time. The references can also be changed dynamically during the lifetime of the object or module in question.

It should be emphasized that the input and output ports in objects or higher-level modules can be integrated during implementation into a unitary functional entity. Persons skilled in the art would appreciate that several techniques are available for implementing an input port, e.g., using a dispatch function along with a table. Although the present invention does not require the implementations of the input and the output ports to be identical, or even similar, considerations of design simplicity may be best served by using identical implementations for both input and output ports. Even greater programming efficiency can be obtained by combining the input and output port implementations into a single functional entity.

Figure 9:
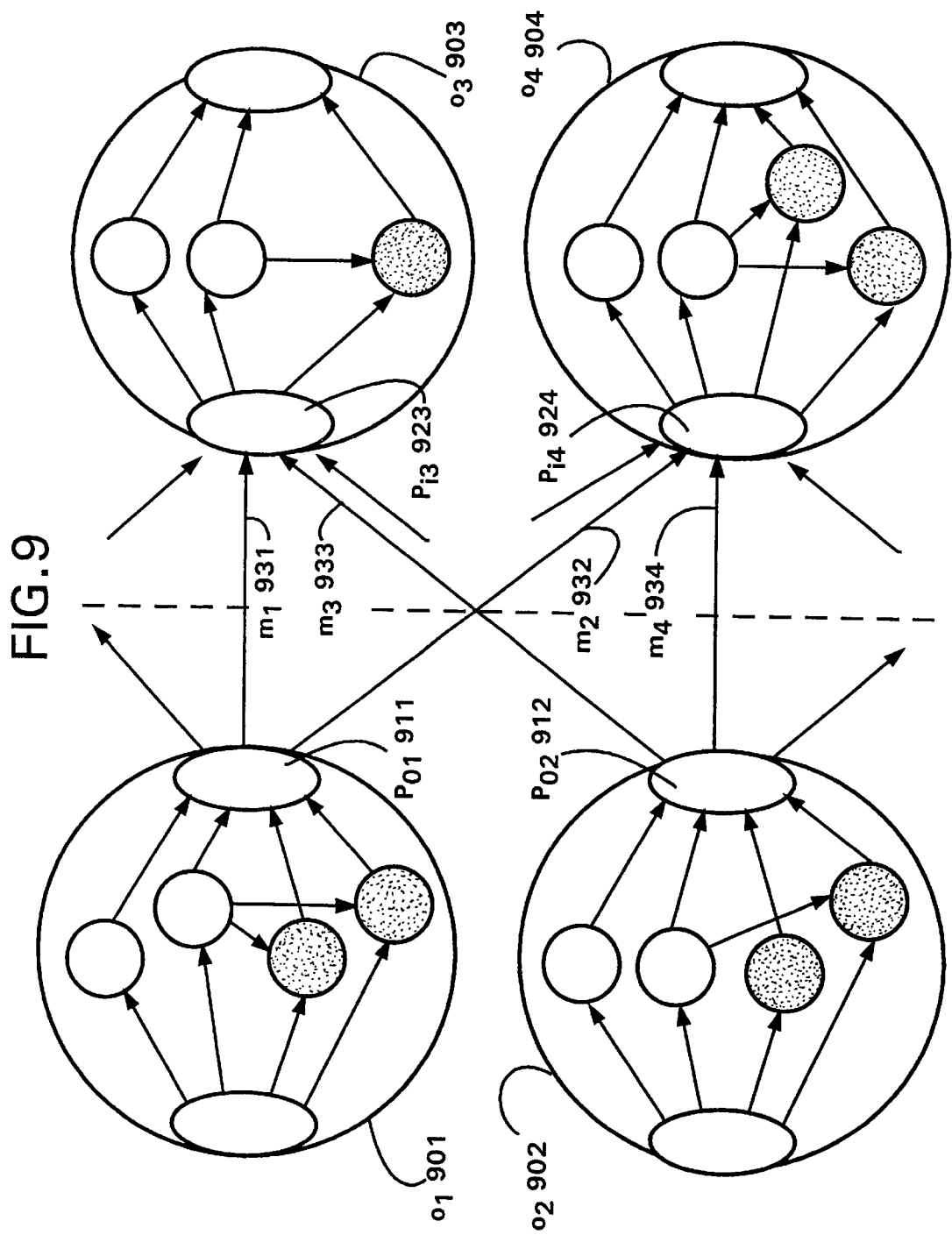
FIG. 9 is a higher-level illustration showing the interaction and operation of the enhanced objects or modules depicted in FIG. 8.

FIG. 9 shows an application of the output port concept shown in FIG. 8. In such a case, the output ports in a network of objects (or modules) operate like a locally distributed dispatch function as shown in FIG. 9. The output ports $p_{o1}$ 911 and $p_{o2}$ 912 of objects (or modules) $o_1$ 901 and $o_2$ 902 can thus invoke objects (or modules) $o_3$ 903 and $o_4$ 904 by sending messages $m_1$ 931, $m_2$ 932, $m_3$ 933 and $m_4$ 934 to the input ports $p_{i3}$ 923 and $p_{i4}$ 924 of objects (or modules) $o_3$ 903 and $o_4$ 904 respectively.

The replacement of symbolic references (or the binding of variables) by references to instantiated objects (or modules) at compile-time or at run-time, as discussed above, aids in separating the task of creating a composition and coupling structure for each composed object (using lower-level object instances) from the task of describing the content and behavior of each individual module's object class. Such a separation is of great practical importance because it permits a truly modular architecture and system framework to be provided from which specific variants can be created later with very little additional effort.

It should be noted that the output port concept shown in FIG. 8 bears some similarities to the centralized approaches shown in FIGS. 6 and 7. However, the output port concept can provide additional programming flexibility in some circumstances. This can be best understood by considering an example. If two objects (or modules) $o_1$ and $o_2$ both refer initially to an object (or module) $o_3$, under the centralized approaches shown in FIGS. 6 and 7, if object (or module) $o_3$ were to be replaced by an object (or module) $o_4$, then objects (or modules) $o_1$ and $o_2$ would now both point to the same object (or module) $o_4$. In contrast, by using the output ports shown in FIG. 8, a software developer obtains additional programming flexibility because objects (or modules) $o_1$ and $o_2$ can now point to different objects (or modules), say, $o_5$ or $o_6$. This ability to change object/module links and pointers selectively is very useful in improving the modifiability of software programs.

Replacing Inheritance with Composition: Analyses of the object-oriented paradigm have traditionally focused on the hierarchies of object classes. It has been found in practice that excessively deep inheritance structures can make it difficult to modify an object-oriented software program. This is because inheritance relationships often create undesirably strong structural coupling. Furthermore, a composition structure is almost always needed, thus making it necessary to maintain a two-dimensional structure—an even more daunting task. The class hierarchy creates a dimension or view that focuses on behavior and data similarities while the composition hierarchy creates a dimension or view that focuses on composition and coupling structures.

It has been found that changes in the class dimensionality often influences objects in their composition dimension. Thus, software systems become rigid and inflexible because changes in a generic object that is the root of a class hierarchy influences all of its ancestors and every system composition where it is used as a module, unless a particular change is overwritten by local design rules in some of the ancestors of the generic object.

It should be noted, however, that the existence of an effect does not automatically imply that there will always be operational problems. For example, the internal implementation details of functions may be changed at any time without substantial operational effect as long as the meanings of the appropriate functions are preserved. Nonetheless, small changes in attribute representation may still influence the encoding of the external message and cause trouble at the system-level unless the attribute values are isolated using specific access functions.

Figure 10:
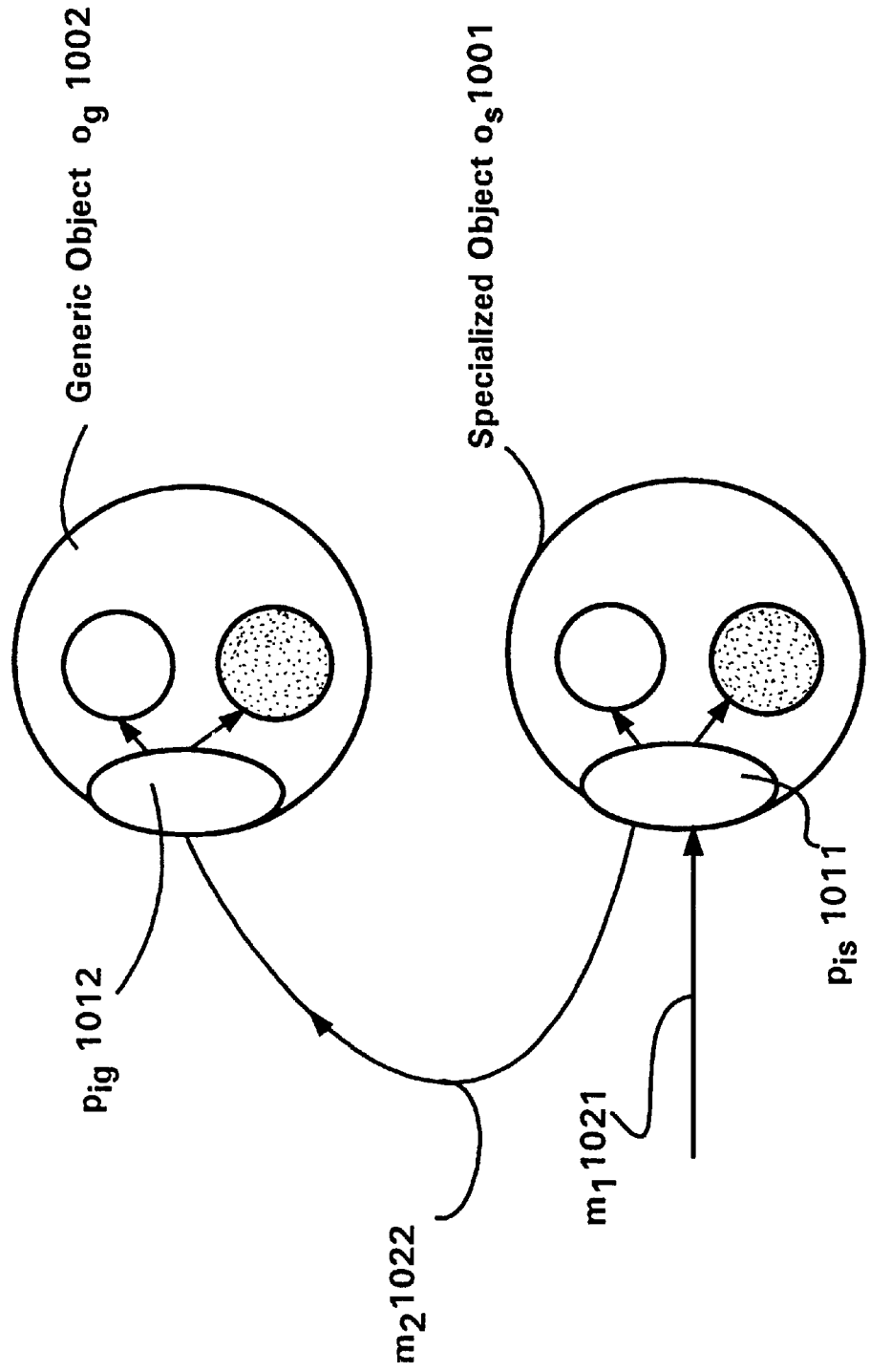
FIG. 10 shows a further embodiment to the present invention where a specialized object or module inherits its behavior from a generic object or module.

FIG. 10 shows the inheritance relationship between a specialized object (or module) $o_s$ 1001 and a generic object (or module) $o_g$ 1002 in a traditional object-oriented programming environment. When the specialized object (or module) $o_s$ 1001 is invoked by a message $m_1$ 1021 received at its input port $p_{is}$ 1011, it sends a message $m_2$ 1022 to the input port $p_{ig}$ 1012 of the generic object (or module) $o_g$ 1002.

In an analogous manner, specialized modules can inherit their behavior from other generic modules. As used herein, a generic module is somewhat akin to a skeleton program that is stored as a source document in a library. Such a generic module may be specialized as needed in a specific situation.

Figure 11:
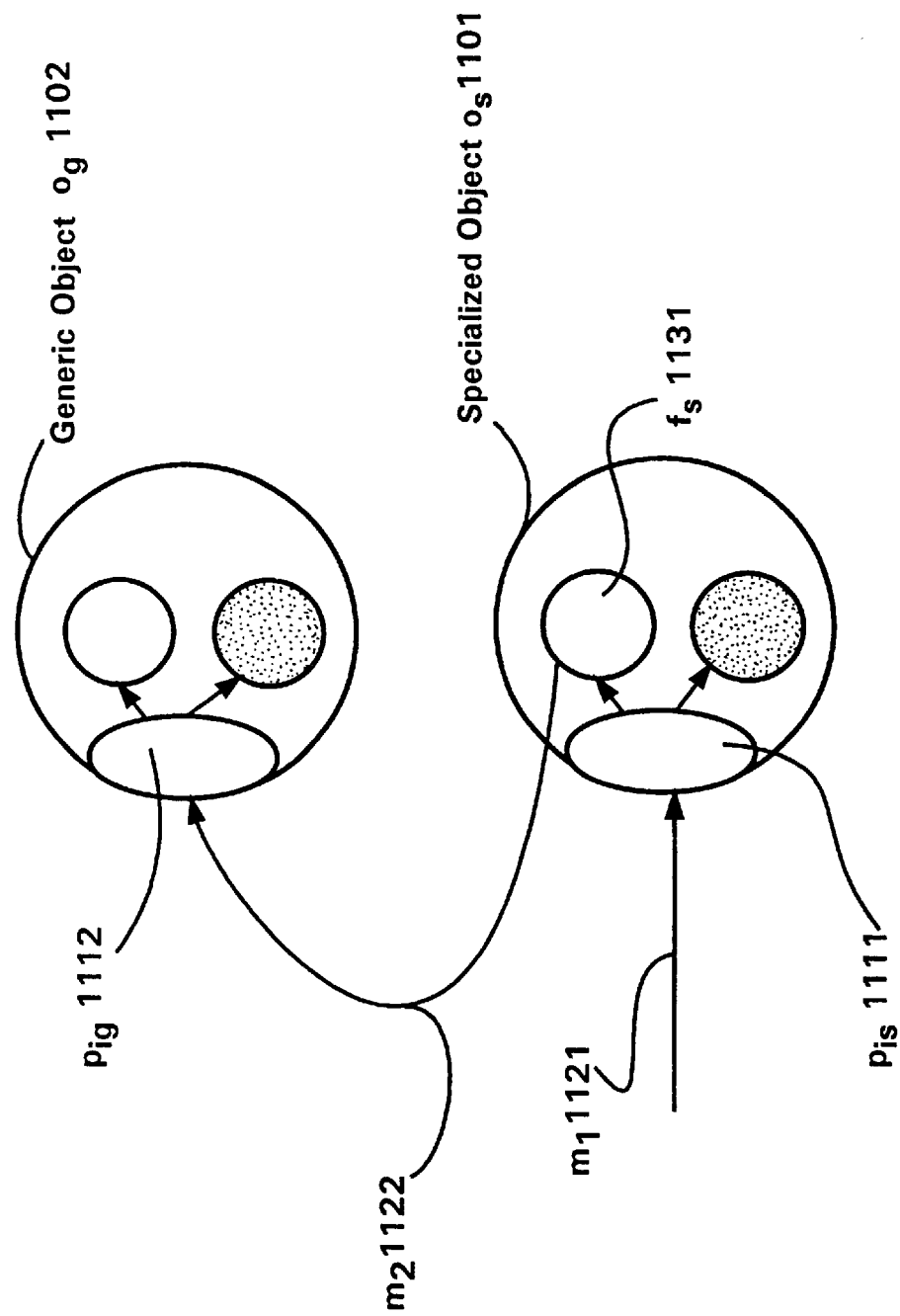
FIG. 11 depicts an additional embodiment of the present invention where the behavior of a specialized object or module is designed based upon cooperation with a generic object or module.

In a further embodiment of the present invention, many of the problems associated with maintaining either a class hierarchy or a composition hierarchy can be circumvented by replacing class hierarchies and their inheritance relationships as shown in FIG. 10 with composed objects (or modules) that cooperate with each other by communications as shown in FIG. 11.

The inheritance model of FIG. 10 should be contrasted to the cooperative model of object (or module) interaction illustrated in FIG. 11, wherein a specialized object (or module) $o_s$ 1101 invokes an internal function (or method) $f_s$ 1131 in object (or module) $o_s$ 1101 upon receiving a message $m_I$ 1121 at its input port $p_{is}$ 1111. The function $f_s$ 1131, in turn, sends a message $m_2$ 1122 to the input port $p_{ig}$ 1112 of the generic object (or module) $o_g$ 1102. Thus, in the cooperative model of object (or module) interaction, each specialized object (or module) can be viewed as an agent that uses generic objects (or modules) as resources as needed. It should be noted that multiple specialized objects (or modules) can all refer to the same generic object (or modules).

Figure 12:
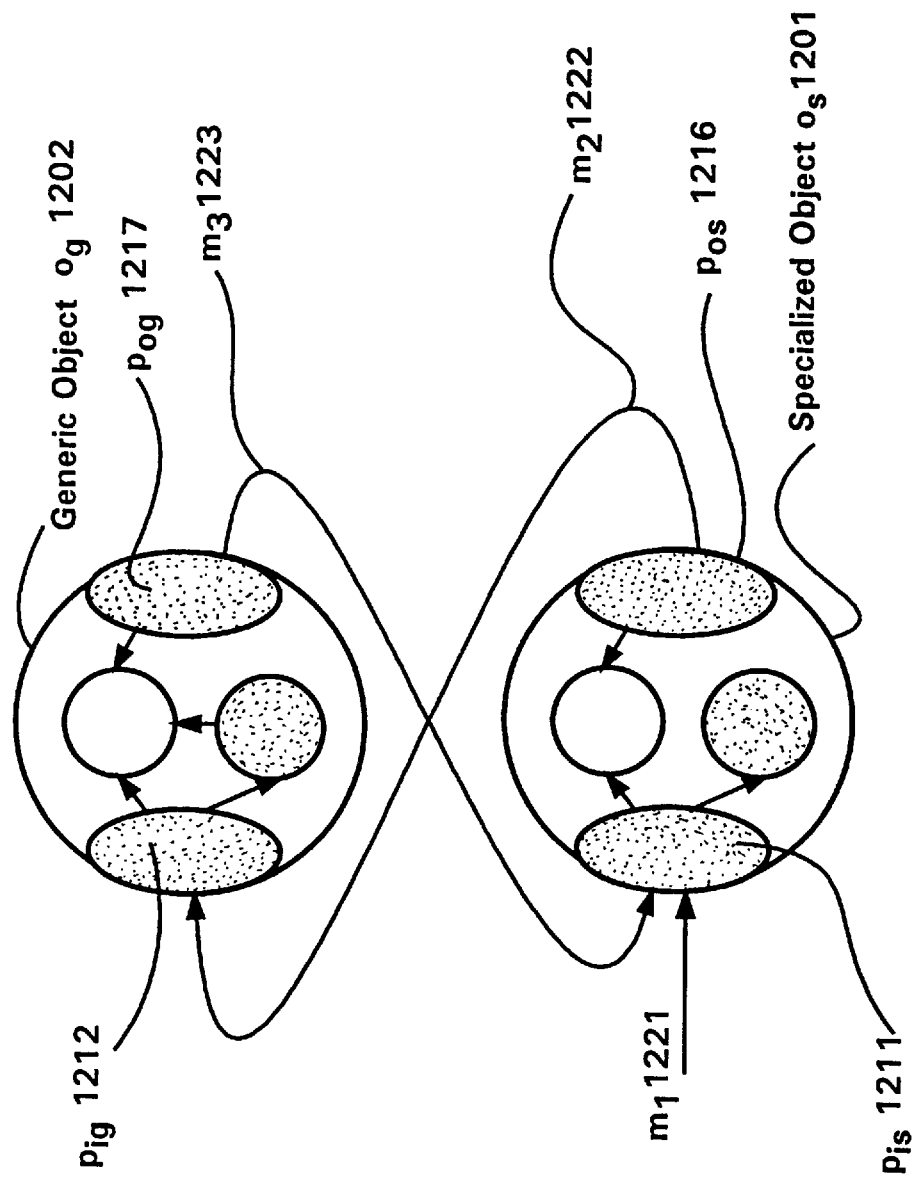
FIG. 12 depicts an additional embodiment of the present invention where the behavior of a specialized object or module having an output port is designed based upon cooperation with a generic object or module having an output port.

The cooperative model of object-interaction can be conjoined with the output port concept of FIG. 8 as shown in FIG. 12 although it should be emphasized that the two concepts—of cooperation and of output ports—are not interdependent. The cooperative model of object (or module) interaction can also be used in conjunction with the centralized switch object (or module) of FIG. 6 or the agent object (or module) of FIG. 7.

In practical terms the cooperative model of module interaction can be implemented either statically or dynamically. The static implementation would be start with a design-template that is specialized or modified to suit a particular application. The dynamic implementation would be have modules cooperate with each other by exchanging messages.

One of the advantages of using a composition structure is that it can be changed dynamically at compile-time or even at run-time—unlike a class hierarchy which needs to be finalized during the design stage of a software system. In addition to this significant benefit, another advantage of using a composition structure is that it permits generic modules to be used in more situations (by combining them) than an inheritance-based structure. Furthermore, the use of a composition structure also eliminates the need for multiple levels of inheritance—the traditional technique for enhancing programming flexibility in the current object-oriented programming paradigm.

Implementation of Composed Objects: At any composition level, modules of the software system may have specialized or distinguished roles such as controllers (also known as control objects), resources (also called entity objects) and interfaces (also known as interface objects). Such a structure can be discerned in many software systems and has also been proposed as part of an analysis method where the underlying analysis model has been partitioned into control objects, entity objects and interface objects, see, e.g., I. JACOBSON, M. CHRISTERSON, P. JONSSON & G. ÖVERGARD, OBJECT-ORIENTED SOFTWARE ENGINEERING: A USE CASE DRIVEN APPROACH 132 (ISBN 0-201-54435-0, Addison-Wesley 1992).

If we compare this to the agent concept described earlier in conjunction with the discussion of FIG. 7, the present technique divides the role of an agent into two parts: an interface element and a control element. It has been found that such a functional separation will be effective only if the influence of any changes in program structure falls largely upon the control element alone while the interface element is influenced only occasionally and resource (or other data-intensive) elements are influenced rarely, if at all.

Figure 13:
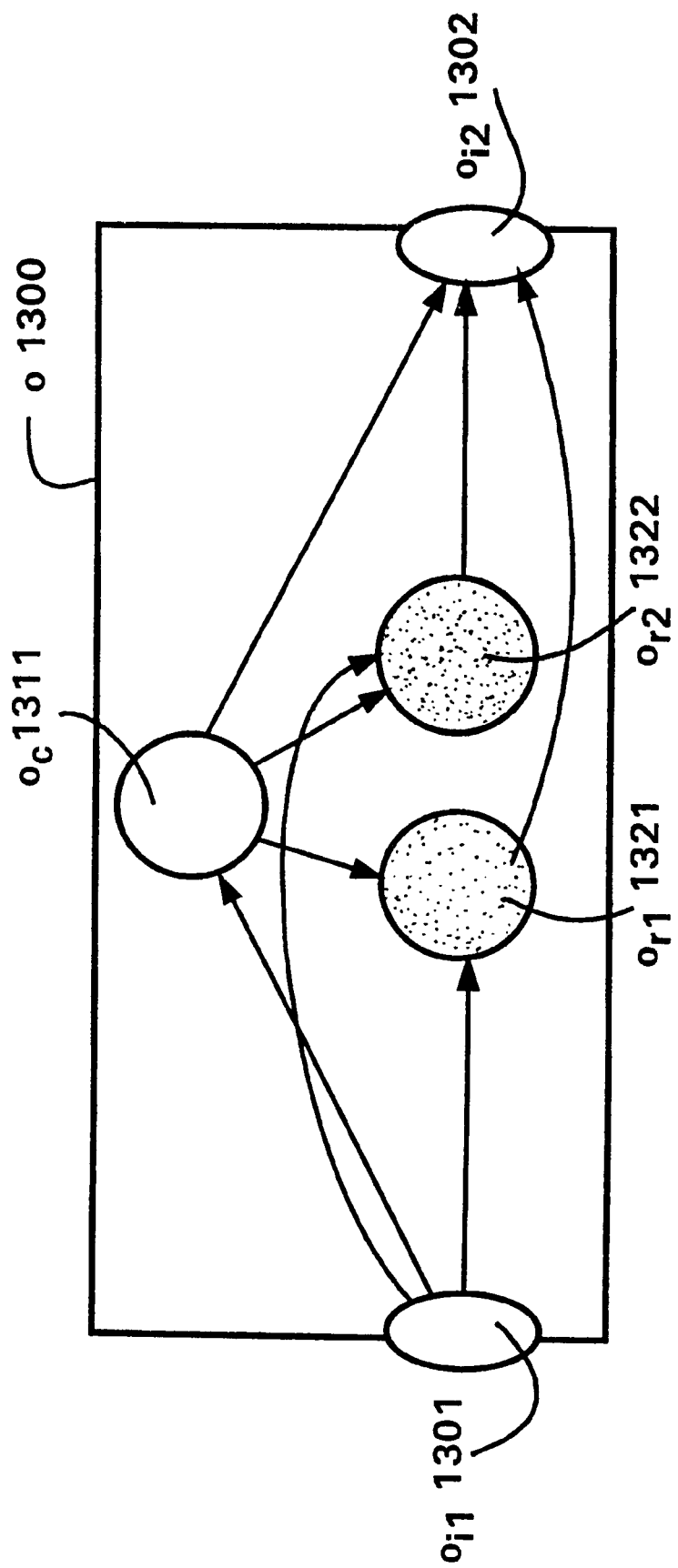
FIG. 13 shows an exemplary implementation of a module as a composed object where interface objects pass information to various control and resource objects.
Figure 14:
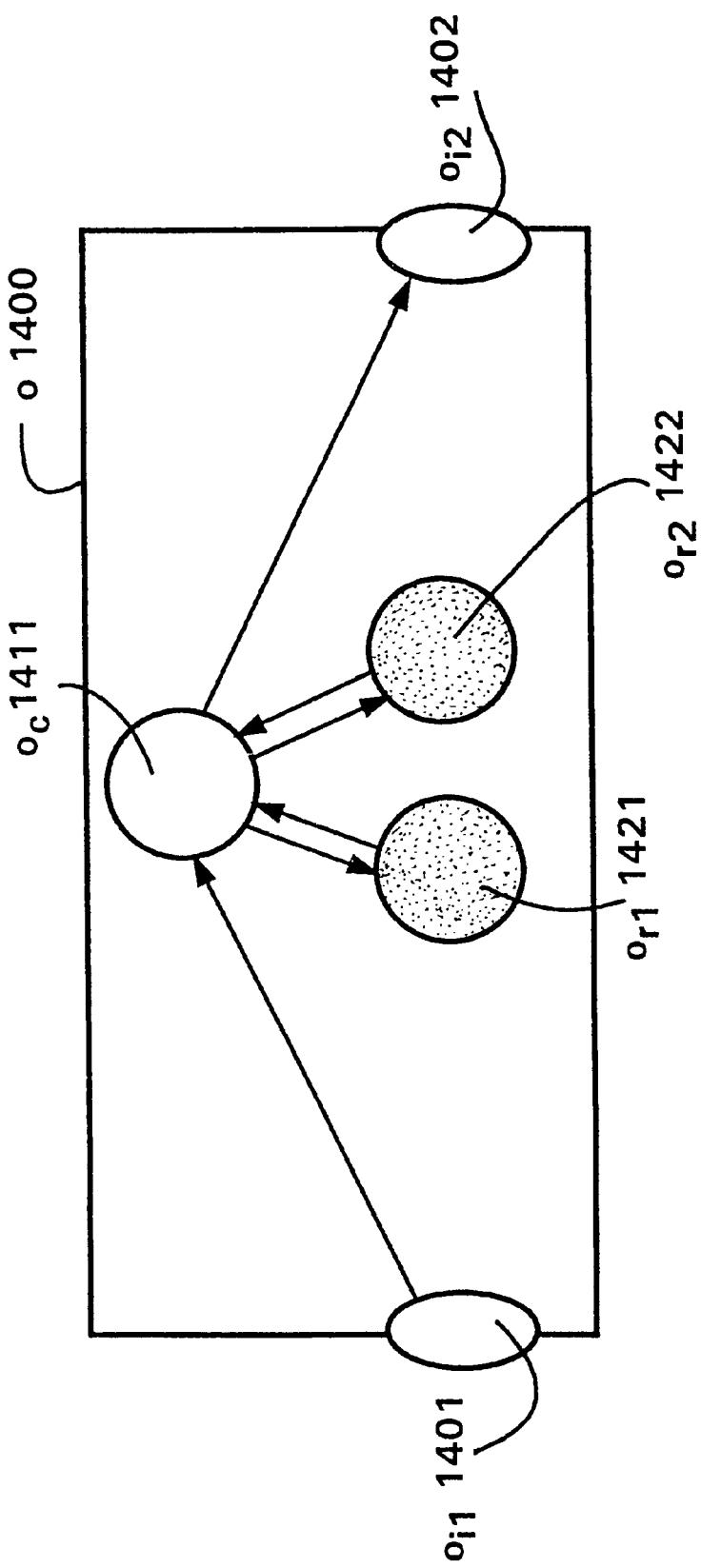
FIG. 14 shows an exemplary implementation of a module as a composed object where all information processed through a unitary control object in the module.
Figure 15:
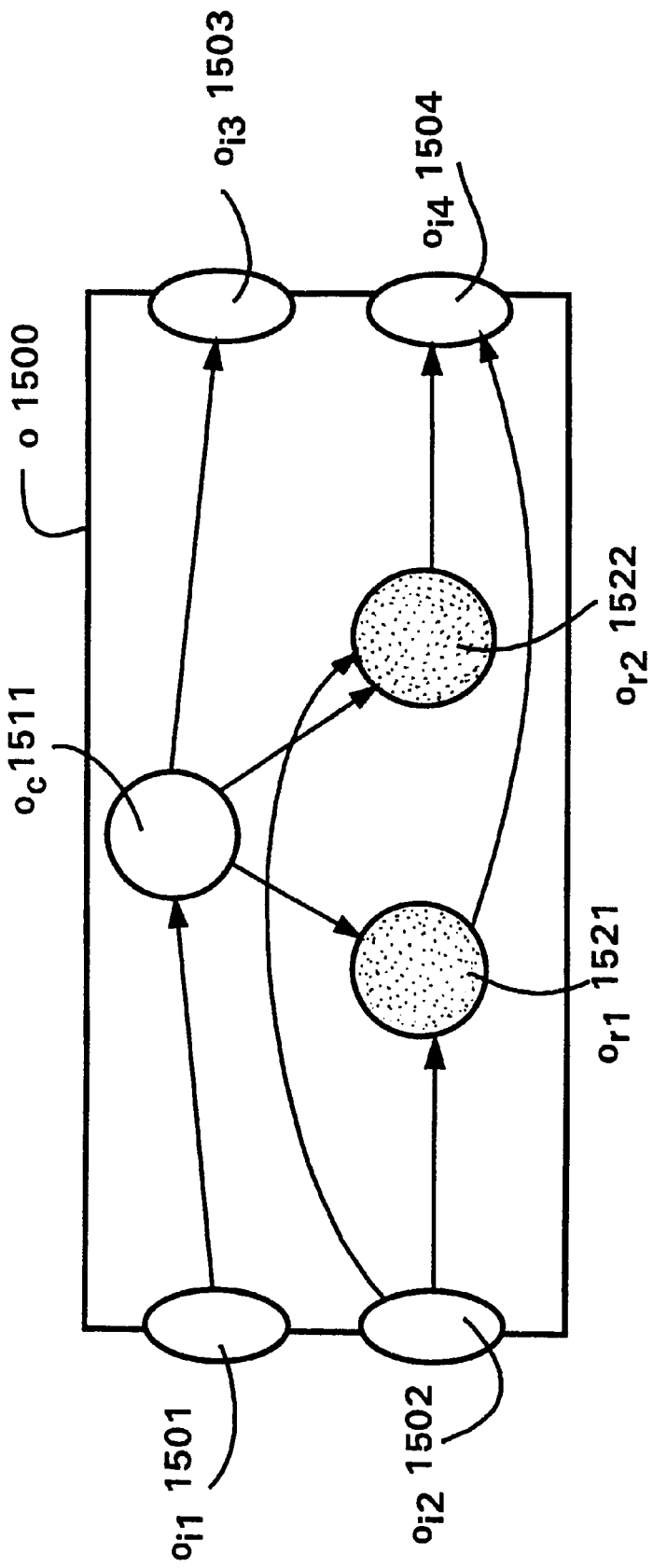
FIG. 15 shows an exemplary implementation of a module as a composed object where separate interface objects or ports are used for dealing with the flow of control information and for data.

There are several ways of implementing a module as a composition of different types of objects or of simpler (or lower-level) modules. Three such exemplary techniques are shown in FIGS. 13–15. In the following discussion of the module implementation techniques shown in FIGS. 13–15, it should be emphasized that modules constitute a higher-level description of a software system than the primitive objects discussed earlier.

Just like primitive objects, modules too can have input and output ports. As can be expected, the input and output ports of a module are higher-level abstractions of the input and output ports of a primitive-level object. Thus the control objects $o_c$ 1311, $o_c$ 1411 and $o_c$ 1511 shown in FIGS. 13–15 can also have behavior associated with it and is not restricted to only switching functions as might be expected of a primitive object. The modules in a software system play various roles and constitute the building blocks of a software system from a higher-level perspective. FIGS. 13–15 depict three exemplary and alternative approaches to the design and development of the architecture of a software system. These approaches which are alternatives to the output port concept of FIG. 8, are not limited to the object-oriented paradigm, as roles can be assigned to the various modules at both high-as well as low-levels.

FIG. 13 shows a module implemented as a composed object o 1300 where interface objects $o_{i1}$ 1301 and $o_{i2}$ 1302 pass information to and from a control object $o_c$ 1311 and resource objects $o_{r1}$ 1321 and $o_{r2}$ 1322. In such an implementation, resources, servers and interface objects can be directed to send all information directly to other controlled objects via an object o 1300 that creates the overall function as shown in FIG. 13.

FIG. 14 illustrates another implementation of a module as a composed object o 1400 where all information passes through a centralized control object $o_c$ 1411. In such an implementation, information is permitted to pass to or from the interface objects $o_{i1}$ 1401 and $o_{i2}$ 1402 to the resource objects $o_{r1}$ 1421 or $o_{r2}$ 1422 only through the control object $o_c$ 1411.

A third technique for implementing a module as a composed multi-ported object o 1500 is depicted in FIG. 15. In such an implementation of a module, the module may comprise multiple input and output ports with separate interface objects (or ports) for dealing with the flow of control information and data. Thus, the interface object $o_{i1}$ 1501 is used for all incoming invocations to the module's control object $o_c$ 1511 while the interface object $o_{i3}$ 1503 is used for all invocations of external objects by the control object $o_c$ 1511.

Similarly, the interface object $o_{i2}$ 1502 is used by external objects and modules to access the resource objects $o_{r1}$ 1521 and $o_{r2}$ 1522 and results are directed to their eventual destination through the interface object $o_{i4}$ 1504. Those skilled in the art will appreciate that it is also possible to implement a module by combining control and interface objects into an unitary object having a role similar to the agent object discussed earlier in conjunction with FIG. 7.

System Modifiability:

Software systems often need to be modified. For example, a generic object maybe customized in several different ways for multiple software application programs, each of which uses modified versions of the generic object. We will next examine the modifiability of a software program at the system level (i.e., at the level of software modules) rather than at the module-level or at the object-level.

As can be seen from the discussion that follows, the modifiability of computer software can be significantly enhanced if software modules had input and output ports. As used herein, a software module can be defined as a composition of one or more objects. Each software module can have more than one input and output port. This is in contrast to an object that is ipso facto permitted to have only one input port and one output port.

The use of input and output ports for objects enhances the modifiability of computer software by both making the modification process systematic and by isolating and localizing the effect of changes to software. As would be appreciated by those skilled in the art, different layers of decoupling can address different problems. An input port, for example, decouples the external world from knowing about the internal operation of a module (or object) while an output port decouples the internal world from knowing about the environment that is external to a module (or object).

It should be noted that the modifiability analysis that follows does not concern the modifiability of the internal elements or structure of an object such as attributes and functions which can be modified by creating new module or object classes. There are at least four principal techniques for system modification: specialization, adaptation, extension and replacement. Each of these four techniques which fall into the first class of solutions to the coupling problem in the object orientation paradigm is considered in greater detail further below.

Figure 16:
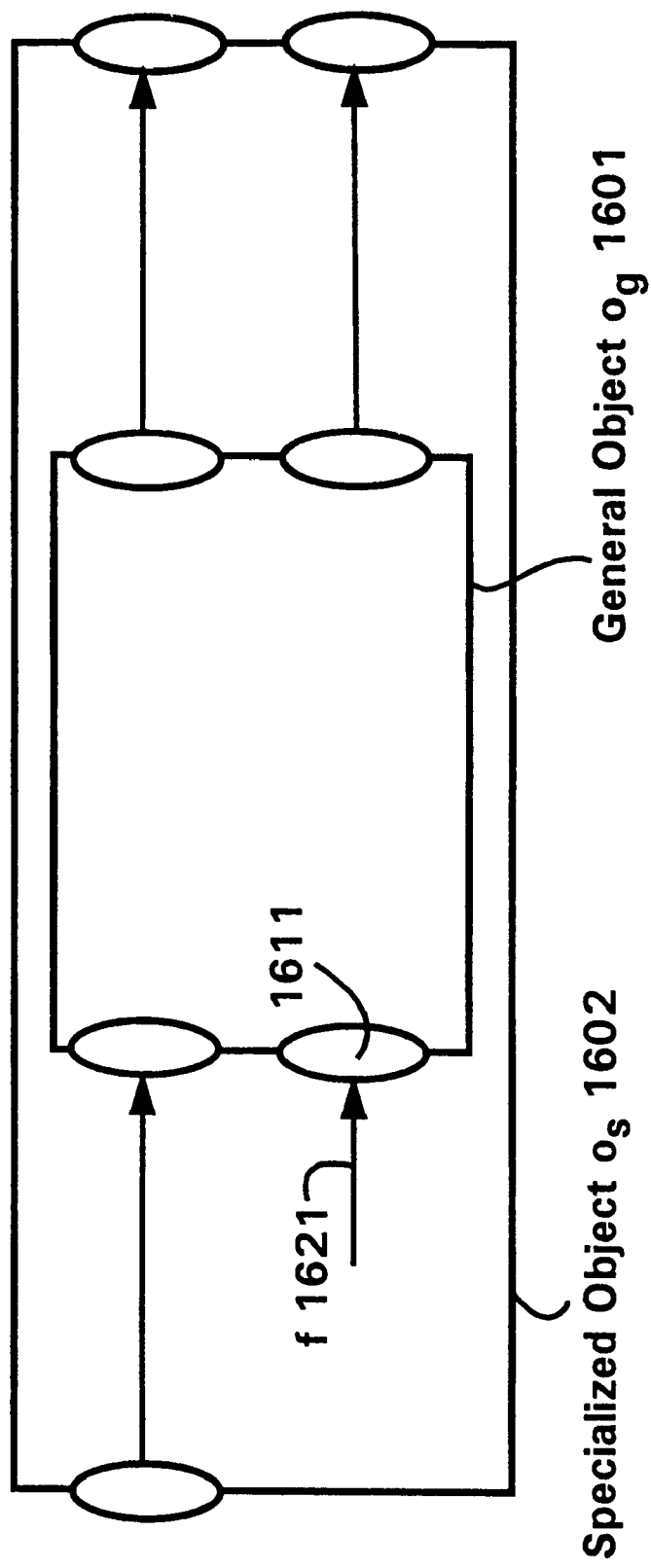
FIG. 16 illustrates the input specialization technique for modifying a software system.
Figure 17:
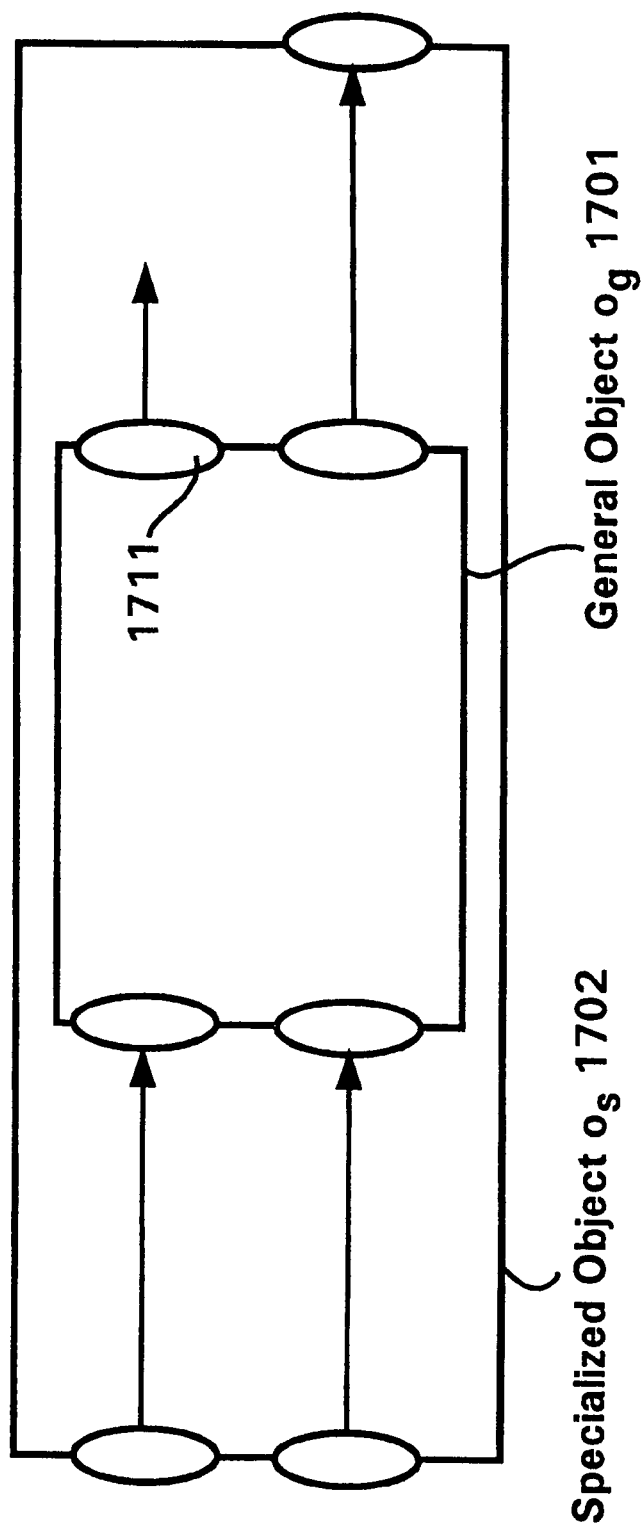
FIG. 17 illustrates the output specialization technique for modifying a software system.

Specialization: A general module $o_g$ 1601 can be modified into a specialized module $o_s$ 1602 by restricting input and/or output ports messages or attribute value domains. This technique which has hitherto been used principally with optimizing compilers is illustrated in FIG. 16 where one of the input ports 1611 of the general module $o_g$ 1601 is bound to a specific function f 1621 to create the specialized module $o_s$ 1602. Just like the input specialization depicted in FIG. 16, one can also have output specialization as shown in FIG. 17, where one of the output ports 1711 of the general module $o_g$ 1701 is left unused to create the specialized object module $o_s$ 1702.

Specialization of modules and objects can be implemented by setting parameters during the design stage. It would be appreciated by those skilled in the art that for output specialization to be useful, it is necessary to first create multi-purpose objects and then selectively activate their functionality at compile-time or run-time. By using a partial evaluation technique that is built into the compiler, the modules and objects can thus be optimized for each particular setting.

Adaptation: Another technique for system modification is adaptation, which is defined herein as the mapping of one or more input or output values to or from a generalized module $o_g$ to create a specialized module $o_s$. The adaptation technique has hitherto been used only with parameterized software wherein software elements are designed as general purpose modules that can handle a variety of inputs. Building in additional functionality over that required to minimally perform the task at hand permits the software elements to be modified with relative ease to handle different tasks than the ones initially contemplated. This technique bears some similarities to the use of filters with data streams. Like specialization, this modification technique also has two flavors: input adaptation and output adaptation.

Figure 18:
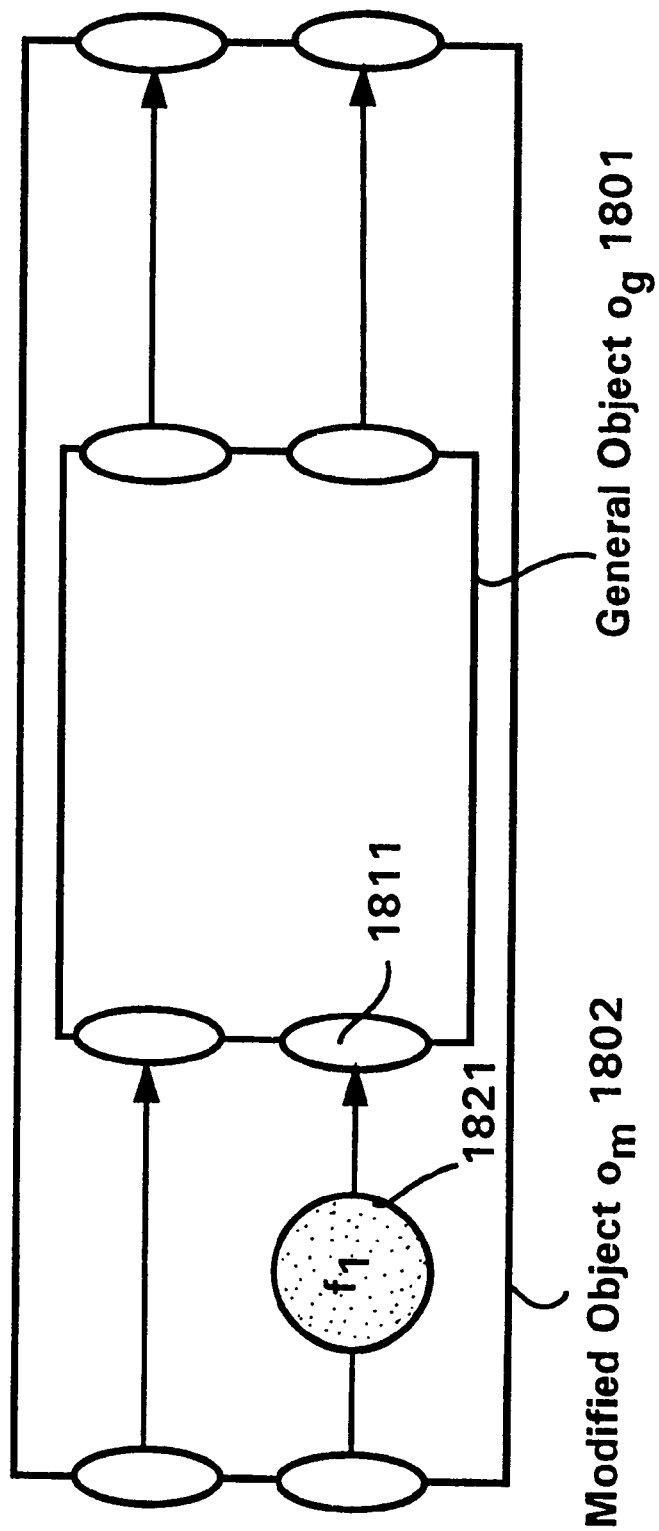
FIG. 18 illustrates the input adaptation technique for modifying a software system.
Figure 19:
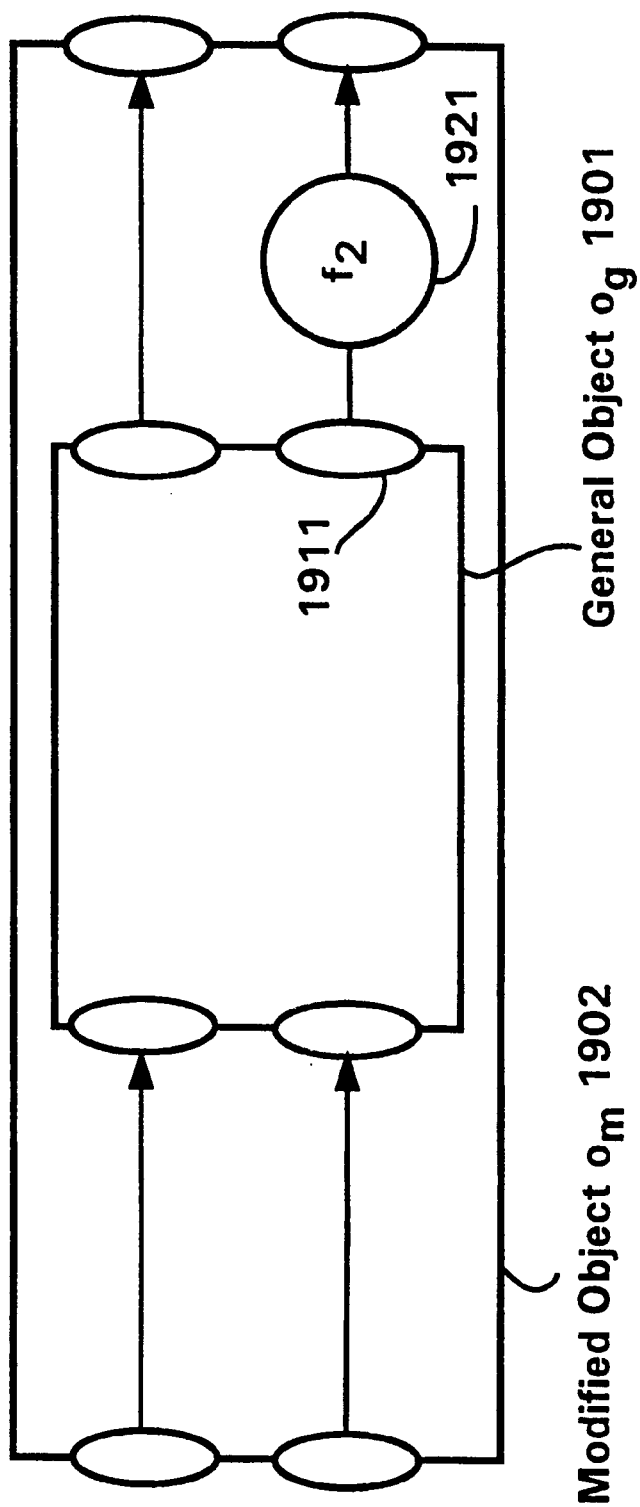
FIG. 19 illustrates the output adaptation technique for modifying a software system.

FIG. 18 illustrates the input adaptation modification technique where one of the inputs 1811 to a general module $o_g$ 1801 is modified by a transformation function $f_1$ 1821 to create a modified module $o_m$ 1802. Output adaptation is depicted in FIG. 19 where one of the outputs 1911 of a generalized module $o_g$ 1901 is modified by adaptation via a function $f_2$ 1921 to create the modified module $o_m$ 1902. As with the specialization technique shown in FIGS. 16 and 17, partial evaluation or program manipulation techniques can be used here too to optimize the implementation of the modified modules.

Extension: The third technique for system modification is to extend the functionality of a general module $o_g$ 2002 or 2102 by coupling it to a new module called an extension module $o_e$ 2003 or 2103. The extension technique for system modification, like the specialization and adaptation techniques described in FIGS. 16–19, also has two flavors: parallel extension and coupled extension.

Figure 20:
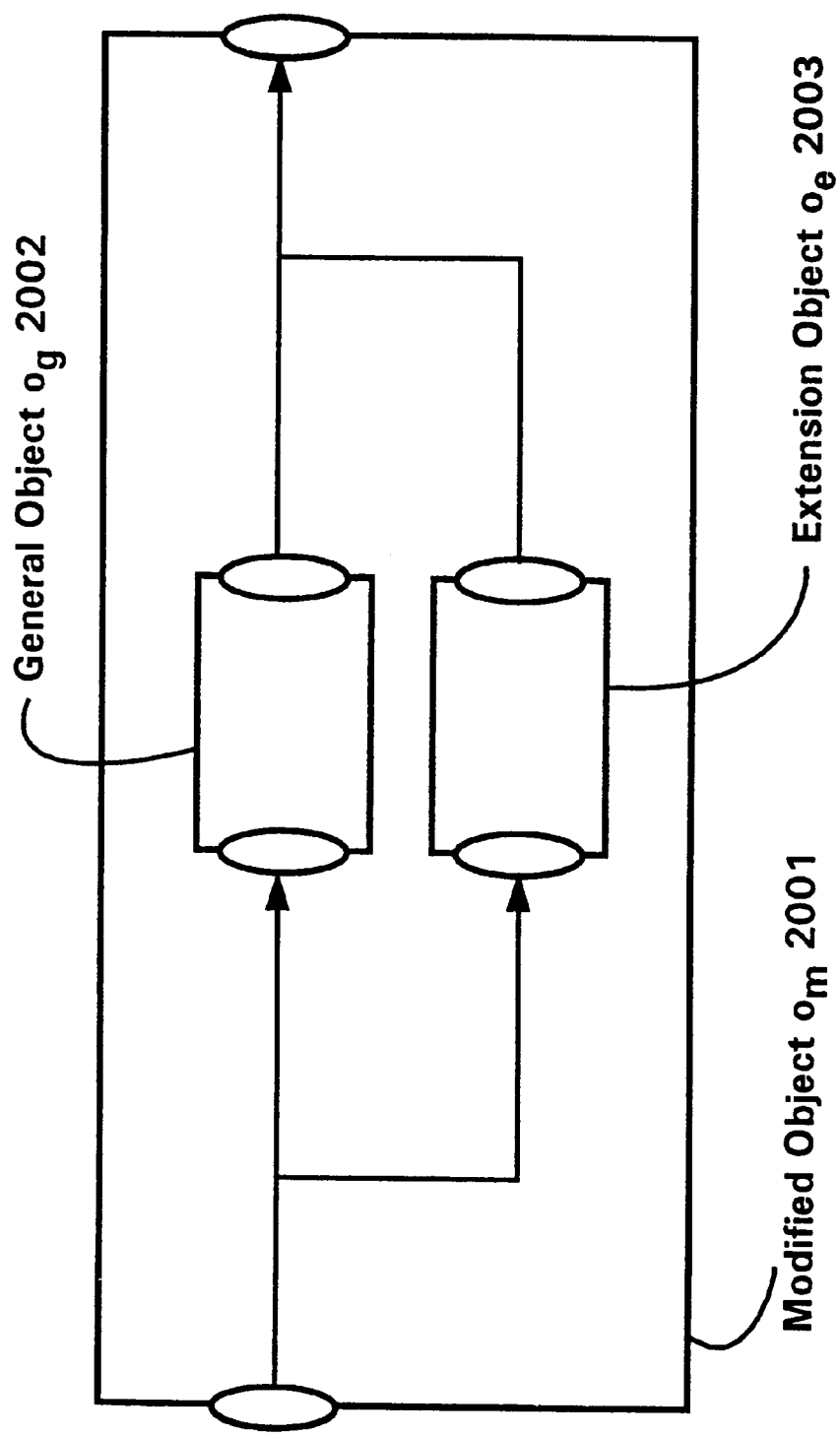
FIG. 20 illustrates the parallel extension technique for modification of a software system.
Figure 21:
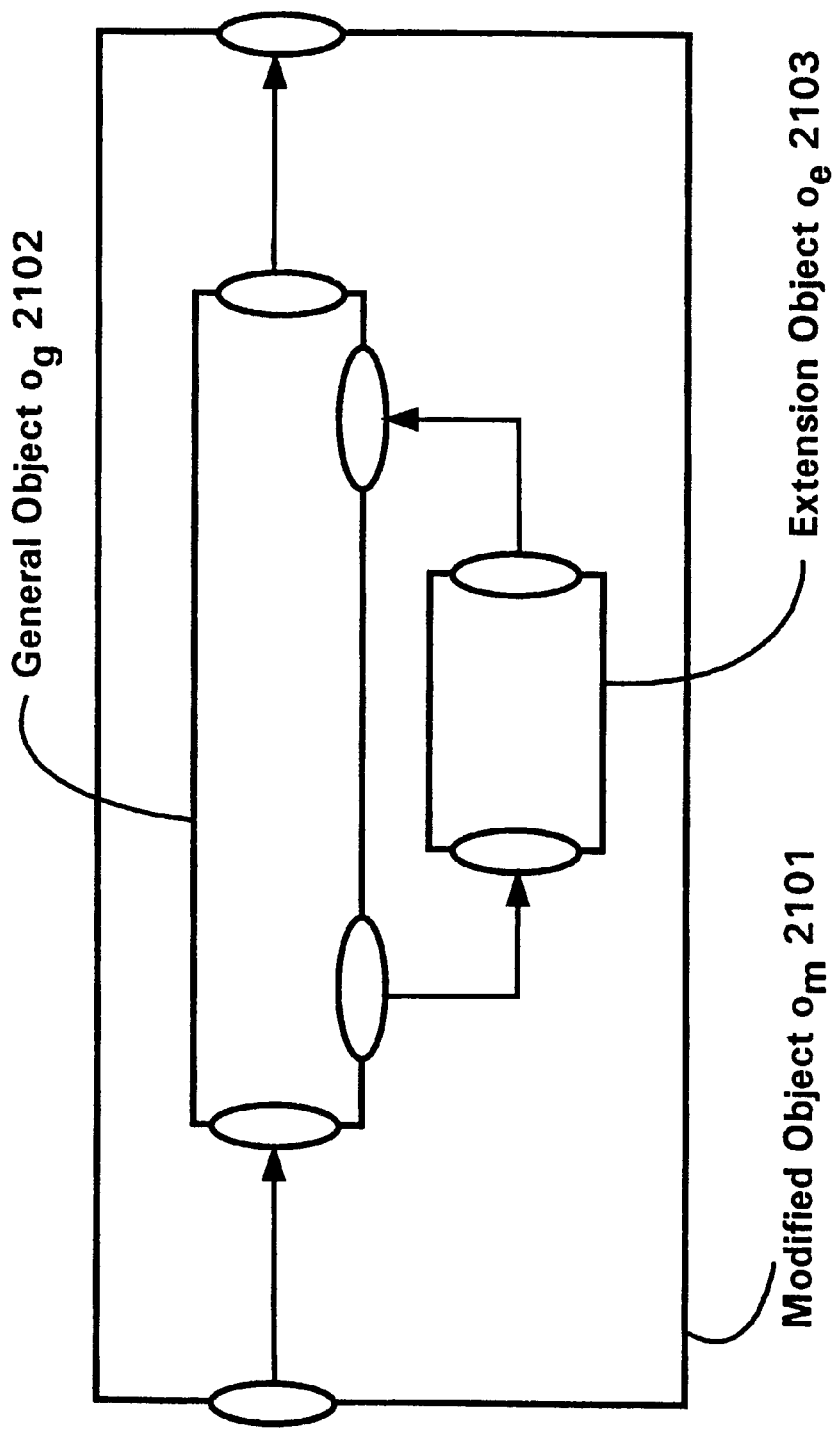
FIG. 21 illustrates the coupled extension technique for modification of a software system.

Parallel extension is illustrated in FIG. 20, where a modified module $o_m$ 2001 is created as a combination of an exemplary extension module $o_e$ 2003 operating in parallel to the preexisting general module $o_g$ 2002. FIG. 21 depicts the coupled extension technique where an exemplary extension module $o_e$ 2103 is coupled as an attachment to the existing general module $o_g$ 2102 to create the modified module $o_m$ 2101.

The extension technique of system modification is very useful whenever one needs to extend a generic element that is common to multiple product lines by combining them with specific elements that are particular to one or more individual product lines.

Figure 22:
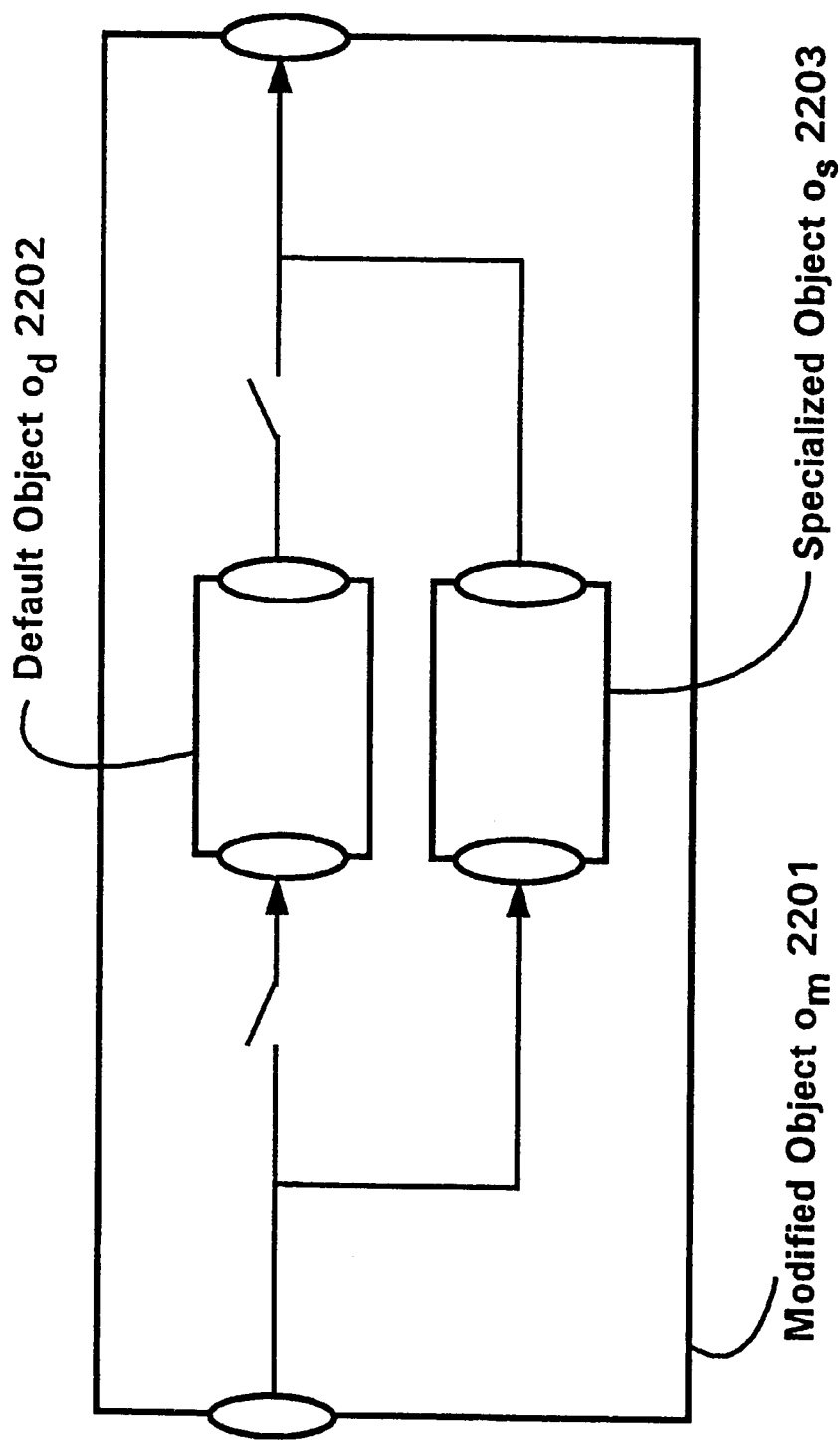
FIG. 22 illustrates the replacement technique for modification of a software system.

Replacement: The fourth technique for system modification is replacement. The replacement technique of system modification is most useful when a default module $o_d$ 2202 is replaced with a specialized module $o_s$ 2203 that uses either the same (or a slightly extended) interface as the default module to create the modified module $o_m$ 2201. This technique is shown in FIG. 22.

Assumptions Underlying the Preferred Embodiment:

A telecommunication software system can be constructed using software modules that implement the desired overall system behavior by interworking between the modules through the interchange of signals (i.e. by message passing protocols) In this paradigm, each module responds to a number of signals, and each signal causes it to perform some action that is also a part of the overall behavior. Such actions may result in the change of the state of the module (and thus indirectly also a change in the state of the system) and may optionally produce new signals that one or more modules may respond to.

In the preferred embodiment of the present invention, signals from one module to another are not sent directly, but instead are sent through an advanced "output port". Such an output port permits each signal to be directed to different implementations of the same recipient module. For terminological simplicity, we will refer to two different implementations of a single recipient module as the "old" version and the "new" version of the module. The technique of the present invention, by using multiple references, provides a mechanism for the relinking of software modules at run time. The cut over from the old version to the new version is typically performed in three phases: the first being an initialization phase, the second being a relay phase and third being a finalization phase.

The software in a telecommunications system is used to access, supervise and control different kinds of resources in order to set up call services and associated connections. Information about such resources can be kept in data records representing the state of the resources. In most cases there are multiple resources of each particular type where the state of each individual resource is represented as a data record of the appropriate resource type. The set of such individual resources can be treated as a pool of allocable resources.

The set of these individual resource data records and an analogous set of data records representing common state and control information about the set of individual resources constitute the data that is operated upon by some program code. This program code and the associated data relating to the pool of allocable resources defines an important program unit that is referred to hereinafter as a software program module.

Services and associated connection resources are available to be utilized by invoking entities that request that type of service. This task is carried out by Access Modules (AMs), typically classified further into an common access part and an individual access part. Different kinds of Access Modules handle access attempts from different kinds of sources or access channels. Each kind of Access Module handles a set of individual access records that correspond to a specific kind of access channel.

When an Access Module identifies a specific service need, a corresponding Service Module (SM) is informed. The common control part of such a service module allocates a service individual to the particular service invocation. Since a service module can have knowledge about the number of critical resources needed and in use, it can also reject service requests that it could not have rejected earlier in the access phase.

To implement telecommunications services, it is usually necessary to utilize and coordinate the services of a plurality of resource individuals. These resource individuals are typically provided by several different Resource Modules (RMs). A Service Individual (SI) represents the control state and other information about a particular instance of a service, for example, it may constitute a sub-record of the access and resource individuals engaged in a particular service invocation.

General Architectural Principles

Based on the above assumptions, it has been found that the design goals can be achieved by following the guidelines outlined below, some of which are mandatory. The following guidelines have been found to be the most important:

Each new service need that is identified by an Access Module has to be associated with a unique Session (or Service) Identity (SI). The SI is used to relate all the different Resource Individuals (RIs) that are used to implement a particular service instance. To assist with fault location purposes, the SI is logged in conjunction with the signal data that is regarded as initiating an access attempt.

Figure 23:
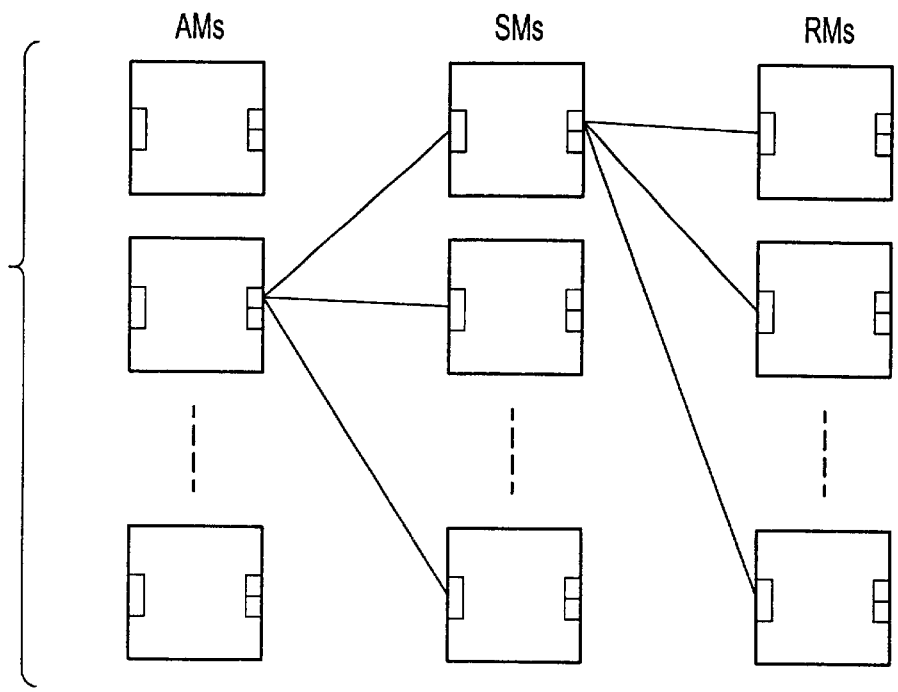
FIG. 23 depicts the linkage of signals from an Access Module to a Service Module that makes use of a set of Resource Modules.

Communication references from one module to another are permitted only via an output port (containing two or more symbolic module references or linking variables) that is bound either at linking time or system configuration time. FIG. 23 depicts the linkage of signals from an Access Module to a Service Module that makes use of a set of Resource Modules. This scheme makes it possible for the linking to be changed when parts of the software system are modified or replaced.

The basic purpose of an output port is to provide linking information for each signal (of a set of signals that are intended to be sent via the output port) from an originating module specifying the receiving module for that signal, provided that the specified receiving module is able to receive and respond appropriately to each of the signals. An output port thus has some common attributes and functional similarity to the Signal Sending Table in an AXE-10 system since it provides an array of linking records.

However, in some situations, we may also want to permit a module to have more than one output port. In such a case a module can (optionally) have a named output port for each receiving module. Each named output port in this example acts as an interface that provides an abstract view of a receiving module.

In a similar fashion, each module may have more than one input port that provides different abstract views of a module as viewed by different user modules. It is thus possible to define complementary pairs of input and output ports that implement communication channels that restrict traffic flow to just subsets of the total set of signals, that are sent from or received by a module.

To make modifications more transparent to users of the system and to minimize the effect of errors resulting from modifications, the output port for each signal should include place holders for both the old module (OM) reference as well as the new module (NM) reference. It should be noted that all communications between modules are performed via signals that are sent via the output port. This permits a signal to be dynamically routed to any of a plurality of alternative implementations of a receiving module.

Figure 24:
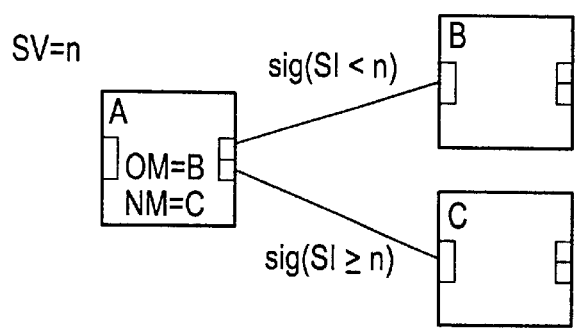
FIG. 24 illustrates the conditional linking of module A to either an old module B or to a new module C based upon a Session Identity token.

A global Selection Variable (SV) is used to indicate that for signals having their SI value lower than the SV value the OM is to be used. For all other SI values, the NM is to be used. This is illustrated in FIG. 24. However, certain specific signals that are indicated by a unique bit setting are permitted to be sent to both the old and to the new module. The value of the SV is used to determine and synchronize the timing of the transition from an old software version to a new version.

Figure 25:
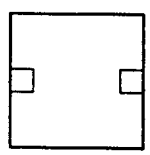
FIG. 25 shows a high-level overview of the simplest implementation of the present invention wherein a module has one input port and one output port.

The linking of signals from an output port to the input ports of two or more alternative implementations of a module can be done at either the signal level or at the port level. The former is referred to as signal linking while the latter is referred to as port linking. Each of these alternative implementations are discussed further below. A high-level overview of the simplest implementation of the present invention can be obtained from FIG. 25, which shows a module having one input port and one output port.

Figure 26:
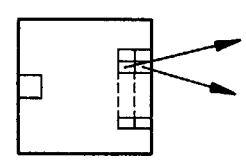
FIG. 26 shows one embodiment of the output port of the present invention wherein each module has only one output port that in turn is implemented as an array of linking records.

Signal Linking: In the first case, referred to hereinafter as signal linking, a signal from an output port of an originating module is linked at the signal level to the input port of one (or more) of two or more alternative implementations of a module. In the case of signal linking, each module has only one output port as shown in FIG. 26. The output port of each module shown in FIG. 26 can be implemented as an array of linking records, each containing two or more linking variables, one for each signal to be sent via the output port.

In an implementation where there are only two possible receiving modules, the linking variables (or place holders) provide references to both the old module (OM) as well as to the new module (NM). The selection between alternative implementations of a module is performed through a linking record using the signal name as a selection parameter.

As shown in FIG. 26, one linking record, containing two or more linking variables, is needed for each signal that is to be sent through the output port of an originating module. In the basic case where there are just two alternative implementations, the choice between the two alternatives is guided by one or more Global Selection Variables that can optionally be part of the linking record.

The program logic that implements the choice (as either part of the output port or as program instructions that is external to the output port) causes the selection of the old module (OM) for signals related to service instances (SI) whose (temporal) ordering number is smaller than the value of a Global Selection Variable (SV).

Figure 27:
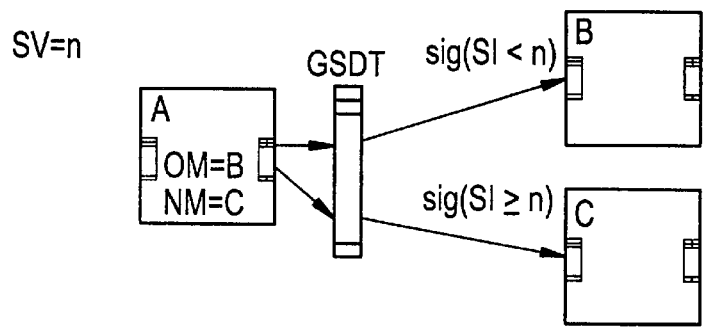
FIG. 27 illustrates the selective linking of a signal from a first module A to the input port of one of two modules B and C based upon the value of a Service Instance (SI) associated with the signal.

Analogously, the program logic causes the selection of the new module (MM) for all other values of the (temporal) ordering numbers. The value of the SV is thus used to determine the timing and synchronize the transition from an old version of a software module to a new version of a software module, as depicted in FIG. 27. FIG. 27 illustrates the linking of a signal from a first module A (having only one output port) to the input port of an old module B if the value of SI associated with a signal is less than n, the value of the global Selection Variable or to the input port of a new module C in other instances.

Figure 28:
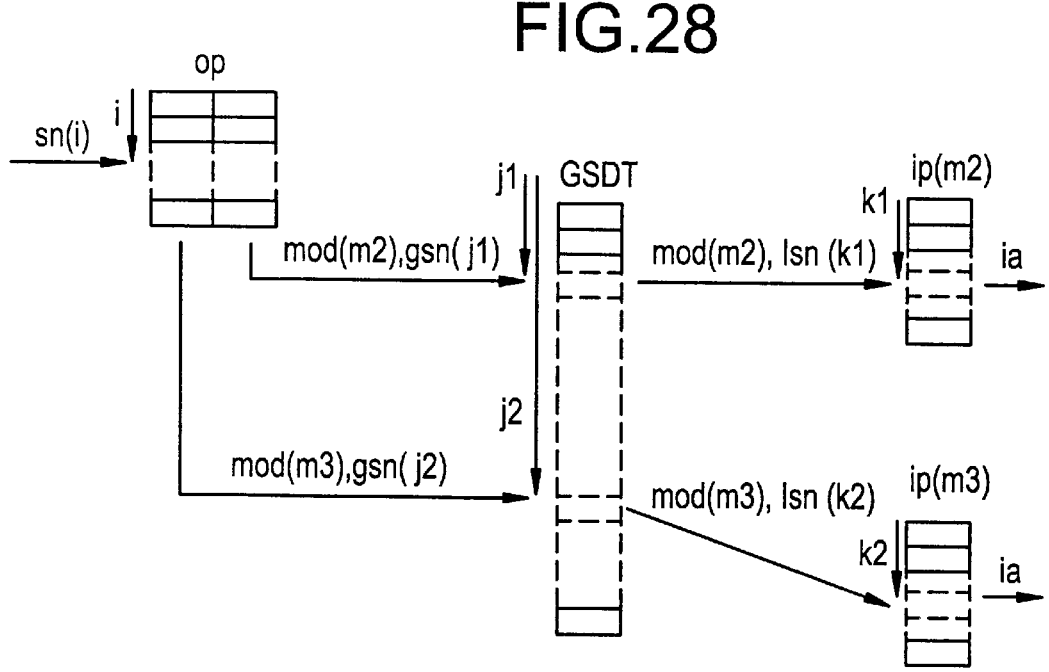
FIG. 28 illustrates an exemplary signal being linked via an output port having a two-variable linking record for each signal to an input port of a selected receiving module.

In FIG. 28, a signal sn(i) is linked via an output port op, or an associated Signal Sending Table (SST) comprising a set of I linking records where there is one linking record for each of the signals sn (i), each of the linking variables containing two variables for each of the signals. Needless to say, in a situation where there are more than two alternative implementations of a receiving module, the Signal Sending Table associated with the output port of an originating module would have one linking variable for each of the alternative implementations of the receiving module.

In the exemplary implementation shown in FIG. 28, m2 and m3 are two alternative receiving modules. The selection variables contain pointers to the input port or an associated Signal Distribution Table (SDT) of a selected receiving module, optionally through a Global Signal Distribution Table (GSDT) that is ordered by Global Signal Number (GSN). In turn, each GSN in the GSDT provides a reference to the Local Signal Number (LSN) of the appropriate receiving module.

Figure 29:
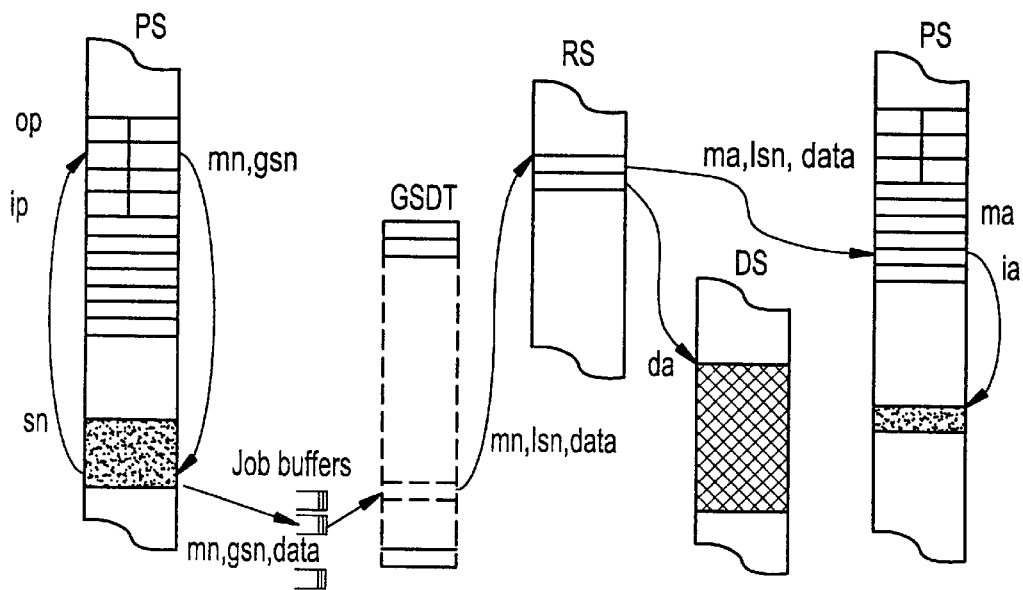
FIG. 29 shows the implementation details of a signal being sent from an originating module to a program in a receiving module using the signal linking technique of the present invention.

The process of sending a signal from one module to a program in another module is illustrated in greater detail in FIG. 29. The Signal Sending Function correlates a signal reference sn to a specific receiving module mn and a Global Signal Number gsn. The module number, mn of the receiving module and the Global Signal Number gsn is converted into a Local Signal Number lsn using the Global Signal Distribution Table (GSDT). The module number mn is used to determine the base address ma of the target program in the receiving module, and the base address da of the corresponding data in the receiving module. The issues relating to the data will not be discussed further.

The base address ma of the target program and the Local Signal Number lsn are used to obtain the address ia of the instructions to be executed in the receiving module. The memory is partitioned into a program store (PS), a data store (DS) and a reference store (RS). These different types of memory spaces can either be physically distinct or be logical partitions of the same physical memory.

Figure 30:
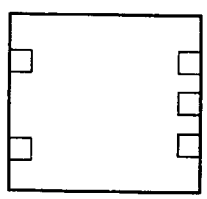
FIG. 30 shows an alternative embodiment of the output port of the present invention wherein an exemplary module is depicted as having two input ports and three output ports.

Port Linking: In the second case, referred to hereinafter as port linking, a signal from an output port of an originating module is linked at the port level to the input port of one (or more) of two or more alternative implementations of a module. In the case of port linking, each module can have more than one output port as shown in the exemplary illustration of a module having two input ports and three output ports depicted in FIG. 30. Each output port of an originating module shown in FIG. 30 is associated with one linking record that contains two or more linking variables, one for each signal to be sent through that output port.

Figure 31:
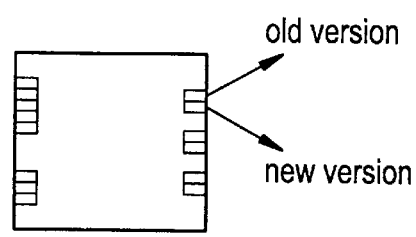
FIG. 31 shows each input port of a receiving module as having one linking variable while each output port of an originating module has one linking variable for each of the various receiving modules.

In an implementation where there are only two possible receiving modules, the linking variables (or place holders) provide references to both the old module (OM) as well as to the new module (NM) as shown in FIG. 31. The selection between alternative implementations of a module is performed through a linking record using the destination port name as a selection parameter.

In FIG. 31 illustrates that each input port has one linking variable for each signal that it is permitted to accept while each output port has two or more linking variables, one for a first (typically, an old version of the) module and at least a second for the second (typically, a new version of the) module.

As shown in FIG. 31, one linking record, containing two or more linking variables, is needed for each output port of an originating module. In the basic case where there are just two alternative implementations, the choice between the two alternatives is guided by one or more Global Selection Variables that can optionally be part of the linking record associated with the output port in question.

The program logic that implements the choice (as either part of the output port or as program instructions that is external to the output port) causes the selection of the old module (OM) for signals related to service instances (SI) whose (temporal) ordering number is smaller than the value of a Global Selection Variable (SV).

Figure 32:
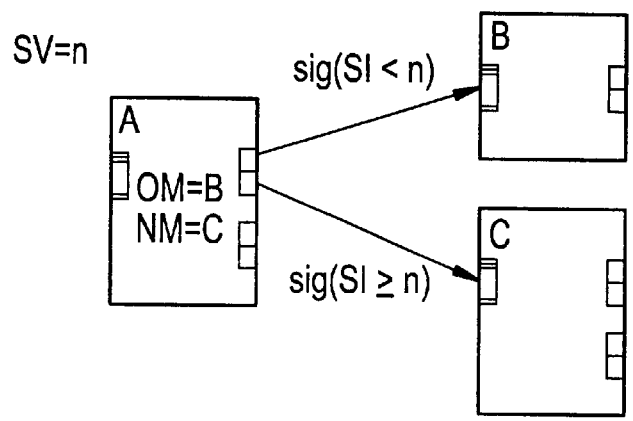
FIG. 32 illustrates the selective linking of a signal from a first module A to the input port of one of two modules B and C based upon the value of a Service Instance (SI) associated with the signal.

Analogously, the program logic causes the selection of the new module (NM) for all other values of the (temporal) ordering numbers. The value of the SV is thus used to determine the timing and synchronize the transition from an old version of a software module to a new version of a software module, as depicted in FIG. 32. FIG. 32 illustrates the linking of a signal from a first module A that is directed to a named output port to the corresponding input port of an (old) module B if the value of SI associated with a signal is less than n, the value of the global Selection Variable or to the corresponding input port of a (new) module C in other instances.

Figure 33:
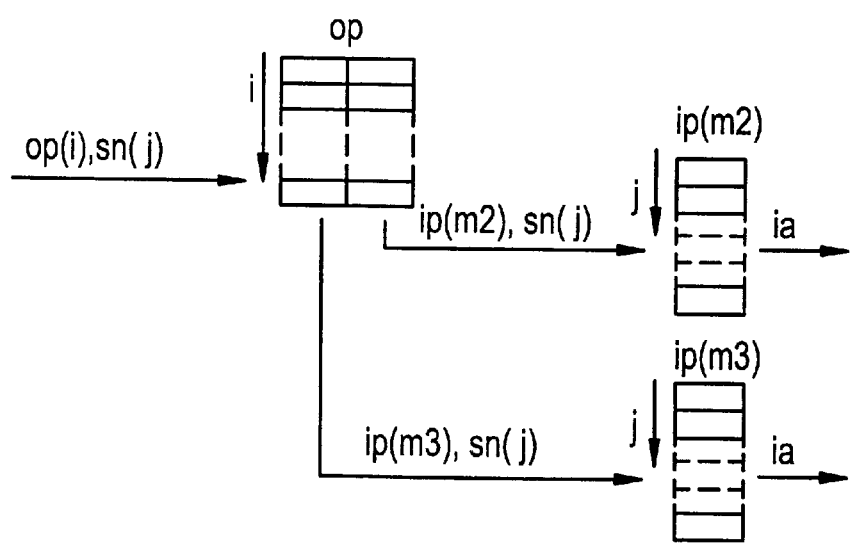
FIG. 33 illustrates an exemplary signal directed to a named output port, where each output port is implemented as an array of two-variable linking records, being linked to a corresponding input port of a selected receiving module.

In FIG. 33, a signal sn(i) directed to a named output port op(i) where the output port is implemented as an array of linking records, each of the linking variable containing as many linking records as there are alternative implementations of the receiving modules, is linked to the corresponding input port of a selected module implementation.

In the exemplary implementation shown in FIG. 33, m2 and m3 are two alternative receiving modules. The selection variables contain pointers to the corresponding input port or an associated Signal Distribution Table (SDT) of a selected receiving module, optionally using the Signal Number (SN) of the corresponding input port of the receiving module.

Figure 34:
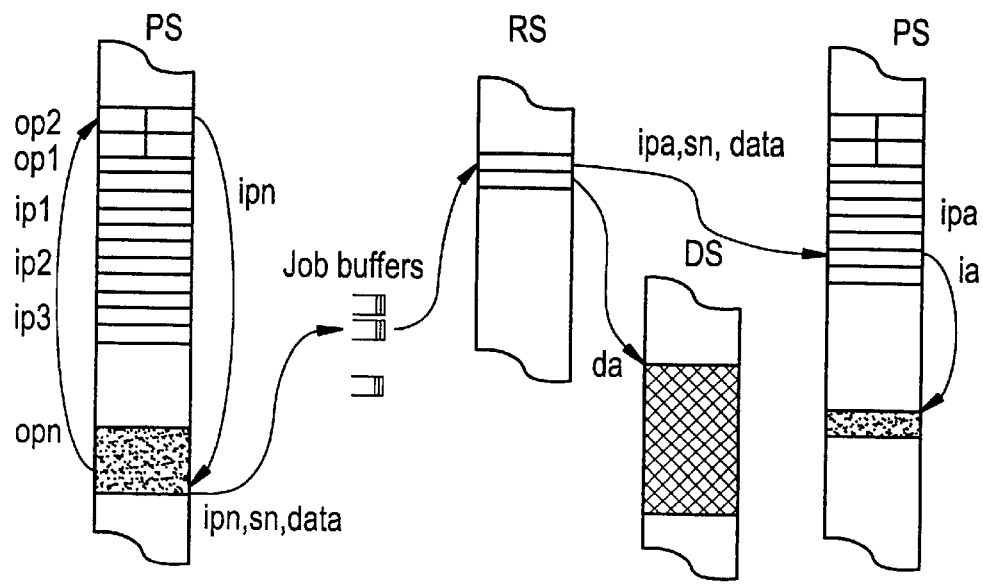
FIG. 34 shows the implementation details of a signal being sent from an originating module to a program in a receiving module using the port linking technique of the present invention.

The process of sending a signal from one module to a program in another module is illustrated in greater detail in FIG. 34. The Signal Sending Function receives a reference to a specific input port ipn of a receiving module via an output port opn of the originating module. The input port number ipn is used to determine the base address ipa of the corresponding input port in the receiving module, and the base address da of the corresponding data in the receiving module. The issues relating to the data will not be discussed further.

The base address ma of the target program and the Signal Number sn are used to obtain the address ia of the instructions to be executed in the receiving module. The memory is partitioned into a program store (PS), a data store (DS) and a reference store (RS). These different types of memory spaces can either be physically distinct or be logical partitions of the same physical memory.

In the case of port linking, the output port is treated as an abstract interface to a receiving module and all signals sent to a given output port are redirected to a new implementation of the module via a new version of the port if the signal contains an SI with selection properties as detailed earlier. The selection mechanism is hence used to select the appropriate port or module while the linking variable corresponding to each signal is used to select the destination for directing that signal.

In an alternative implementation, one can map the signal sent from a module directly (via job buffers and a reference store) to the input port (or an associated Signal Distribution Table) thus bypassing the part of the output port that corresponds to a Signal Sending Table. This can decrease the storage needs of the output ports and make the process of dynamic linking faster. It can also reduce the need for a GSDT since each module using multiple signals can now have one output port for each possible receiving module for a multiple signal, providing that proper port definitions of all receiving modules are readily available at the time of compilation of a module. This can permit an input port to be extended still further even though a user of a port may not use all the signals made available via the port. Another benefit of such a solution is that several compatibility problems can be solved since a new module can support more than one version (or generation) of an interface by providing a separate input port for each interface version that is supported.

However, a GSDT can still be used in some cases since it can simplify the programming, compilation and linking processes by allowing a freer ordering of the signals that are named in port declarations. The use of a GSDT can also allow the implementation of the functions that are made available via an output port to be split over several modules and thus several input ports. The latter can however also be achieved by using a combination of the signal linking and port linking techniques described above.

Figure 35:
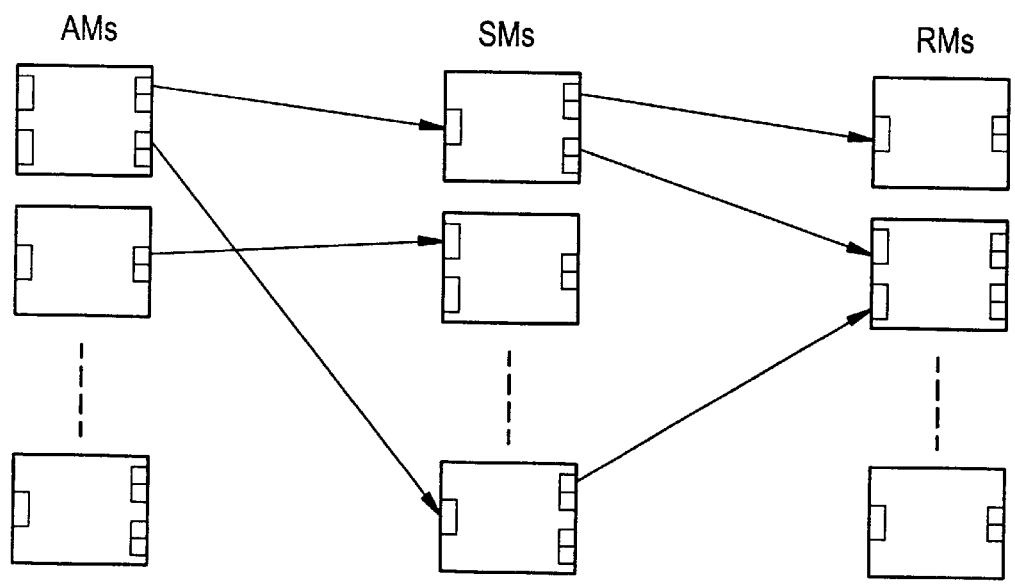
FIG. 35 shows the interworking of access modules, service modules and resource modules where the various modules have varying numbers of input and output ports.

In FIG. 35 signals from one or more access modules are linked to one or more service module each of which invokes (and thus sends signals to) one or more of a set of resource modules. Each of the modules shown in FIG. 35 can have varying numbers of input and output ports.

In order to limit the overhead associated with continually comparing SI with SV, such comparisons are to be done only in a specific configuration mode.

During the initialization phase, a NM (or more specifically the control part of an NM) is assigned all free individuals controlled by the OM. During the relay phase that follows initialization, all individuals seized by the OM that become free are successively allocated to the NM. The old individuals then send specified parts of their data to the new individuals via an optional Translation Function (TF).

The relay phase ends when all individuals controlled by the OM have been released for reallocation. In the finalization phase that follows the relay phase, the old module sends specified parts of its common data via a TF to the NM.

If a fault occurs, all individuals and all resources associated with a specific SI can be identified and released. The fault conditions and the state of the system following it can be traced from the log. In a special test mode, the chain of events associated with a selected SI can also be traced and logged.

It has been found that the best results are obtained by combining the above guidelines with the following supporting rules that are more architecturally oriented:

The signal interfaces normally remain invariant. They may be extended only under strictly controlled conditions. When larger changes to the format or encoding of a signal are needed, it is assumed that a receiving NM remains prepared to handle the old signal format or encoding until the sending module has been replaced by a new one that uses the new format or encoding.

Modules are not given knowledge about other modules at the time of their design. They are given the necessary implementation (address) knowledge only at the time of the system build, i.e. when a system is created by linking different software module instances using the output port concept. Such linking of the modules can be done as early as the system design time, as late as run-time (i.e., dynamically) or at any intermediate stage such as at system configuration time or at load time, depending on the needs of an application.

A general architecture principle would be to partition the system into Access Modules (AMs), Service Modules (SMs) and Resource Modules (RMs) each of which manage access, service and resource individuals respectively. Access modules are not provided knowledge about Service Modules. However, they must be provided or must have access to the mapping between the identified service need (as given in an access signal) and the Service Module that is responsible for providing the appropriate service.

Knowledge about how resource individuals from different resource modules are combined to make a service is handled by the Service Modules. It has been found desirable to keep Resource Modules isolated from explicit knowledge about other resource modules away. However, a resource individual should have the ability to respond to or have a reference to the service individual invoking it.

The system should be partitioned in a way that permits software to be modified during run time. It is additionally desirable to be able to modify a Resource Module independently from the modification of other Resource Modules. If the order of modification begins with the Resource Modules, proceeding to the Service Modules and then finally to the Access Modules (which would be the proper order for modification if the AMs invoked one or more SMs and the SMs, in turn, invoked one or more RMs), then a system implementation based on these principles can permit run-time modifications to be made with no disturbance other than a temporary loss in performance and the concomitant management effort at the next higher level of software.

Advantages of the Present Invention:

The indirect addressing of other modules via an output port that permits reference to two or more modules, the use of a selection variable to select between two or more downstream modules, the time stamping (or test numbering) of new access attempts or service attempts and the use of some simple problem partitioning rules makes it possible to use, modify, replace or reuse software modules in many different combinations.

Although it is known to perform dynamic linking of software components using "address servers" or "name servers", most implementations of dynamic linkers result in a less selective global linking. The output port of the present invention is a conceptual advance since it permits a subset of the references to a module A to be selectively substituted by references to module B. Under the traditional approach, this selective substitution was not possible. Thus any substitution of module A by module B always had to be global. Thus the system and method of the present invention allows changes to software systems to be made more selectively.

More than one input port can typically be used to separate the traffic interface of a module from its operational and maintenance interfaces. A module may also be designed to make accept some of its input signals at more than one input port. A correct module shall be implemented as to provide support for all signals defined by the union of all the signals accepted via its input ports.

Extensions of the Basic Concept:

In operating system terminology, a module can be viewed as a process that is implemented as a lightweight process (sometimes called a trace or a thread) that manages a set of individuals that are also implemented as lightweight processes. In object-oriented terminology, the control part of a module can be implemented as a kind of master object (e.g., a single instance of a unique class) that manages a set of slave objects or individuals (e.g., instances of a slave class). In such a context the output ports can be associated with individual processes or objects rather than with modules.

The general architectural principle that all modules should be independent of other modules may in some instances be modified to permit higher-level modules to know about more primitive modules. This hierarchical model permits modules to provide resources that may in reality be composed of resource individuals conjoined with more primitive modules.

The output port concept of the present invention can also be used in distributed and multi-processing environments. All types of modules can be partitioned and their individuals distributed over one or more processors. The output port concept can be applied to distributed and multi-processing environments by using either a segmented address space or a unified address space used by multiple processors. The system and method of the present invention can also be extended to other closely-related application areas such as software used in data communications networks and in industrial process control systems.

As detailed in this patent application, one of the principal impediments to achieving inter-operability, modifiability, implementation-independence and the reuse of object-oriented software modules is the excessive and/or strong coupling between modules. As detailed above, the preferred solution to this problem involves adding two or more output ports to each module and further making this additional output port part of the module-oriented paradigm. In an alternative implementation, each module has a single output port that permits signals or messages to be passed from the module to one or more of a plurality of modules. Such solutions provide the level of indirect addressing that is necessary to manage the earlier-stated design requirements of inter-operability, modifiability and implementation independency.

Another solution to the decoupling problem includes requiring each module to address other modules only indirectly, such as by using specific interface elements. Several variants of this technique have been detailed, described and compared in co-pending U.S. patent application Ser. No. 08/723,107. As noted above, each of these techniques may be applied in different parts, or at different levels, of a software system.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. In a modular telecommunications software development environment, a method for reducing the coupling between the modules of a software application program comprising the steps of:

creating a receiving program module, said receiving program module existing in at least a first version and a second version, said second version being a later version with respect to said first version;

creating an originating program module having at least a first output port and a second output port, wherein said first output port comprises computer program instructions for communicating data from said originating program module to said first version of said receiving program module, and wherein said second output port comprises computer program instructions for communicating data from said originating program module to said second version of said receiving program module;

linking at least said originating program module and a selected version of said receiving program module into a software application program; and wherein a particular signal having said data, a signal reference, and a version value corresponds to both said first output port and said second output port, said computer program instructions using said version value to determine whether to direct said data through said first output port to said first version of said receiving program module or through said second output port to said second version of said receiving program module.

2. In a modular telecommunications software development environment, a method for reducing the coupling between the modules of a software application program comprising the steps of:

creating a plurality of software program modules, including a first module having at least a first output port and a second output port, said first module invoking a second module during its operation, said second module existing in at least a first version and a second version, wherein said first output port comprises computer program instructions for communicating data from said first module to said first version of said second module, and wherein said second output port comprises computer program instructions for communicating data from said first module to said second version of said second module;

linking a selected group of two or more modules into a software application program;

providing at least one invocation of a nonlocal reference, said at least one invocation of a nonlocal reference associated with said data and a version value, said at least one invocation of a nonlocal reference corresponding to both said first output port and said second output port;

executing said software application program by processing said at least one invocation of a nonlocal reference in said first module through said first output port of said first module responsive to said version value pointing to said first version of said second module and through said second output port of said first module responsive to said version value pointing to said second version of said second module.

3. The method of claim 2 for reducing the coupling between the modules of a software application program wherein the communication of data between modules is performed using a message-passing protocol.

4. The method of claim 2 for reducing the coupling between the modules of a software application program wherein said step of linking a selected group of two or more modules into a software application program is performed at system design time.

5. The method of claim 2 for reducing the coupling between the modules of a software application program wherein said step of linking a selected group of two or more modules into a software application program is performed at system configuration time.

6. The method of claim 2 for reducing the coupling between the modules of a software application program wherein said step of linking a selected group of two or more modules into a software application program is performed dynamically at run-time.

7. In a telecommunications environment, a method for selective replacement, testing and activation of modular software units in a telecommunications application program comprising the steps of:

creating a plurality of software program modules, including a first module having at least a first output port and a second output port, said first module invoking a second module during its operation, said second module existing in at least a first version and a second version, wherein said first output port comprises computer program instructions for communicating data from said first module to said first version of said second module, and wherein said second output port comprises computer program instructions for communicating data from said first module to said second version of said second module;

grouping the modules of a modular telecommunications application software into Access Modules, Service Modules and Resource Modules, said Access Module being responsible for managing a plurality of Access Individuals, said Service Module being responsible for managing a plurality of Service Individuals and said Resource Module being responsible for managing a plurality of Resource Individuals, each Access Individual corresponding to a different access channel and each Resource Individual associated with at least one resource for providing a telecommunications service, each Service Individual including control state and other information related to a particular instance of a telecommunications service, said other information including at least one reference to an associated Resource Individual;

assigning a unique Service Identity (SI) to each new service need identified by an Access Module;

specifying a unique local or global selection variable (SV) to indicate when the telecommunications application program is to make the transition from using said first version of said second module to using said second version of said second module;

comparing said Service Identity with said local or global selection variable; relinking the modules of the telecommunications application program by replacing references to said first version of said second module with references to said second version of said second module if the Service Identity is greater than or equal to said local or global selection variable; and executing said software application program.

8. The method of claim 7 for the selective replacement, testing and activation of modular software units in a telecommunications application program wherein said step of comparing said Service Identity with said local or global selection variable is performed only in a configuration mode.

9. The method of claim 7 for the selective replacement, testing and activation of modular software units in a telecommunications application program additionally comprising a test mode wherein data is communicated from said first module to both the first version as well as the second version of said second module.

10. The method of claim 9 for the selective replacement, testing and activation of modular software units in a telecommunications application program wherein events associated with a selected Service Identity are traced and logged during said test mode.

11. The method of claim 7 for the selective replacement, testing and activation of modular software units in a telecommunications application program wherein the transition from using said first version of said second module to using said second version of said second module is performed in phases, and comprises an initialization phase, a relay phase and a finalization phase, with all unallocated resources belonging to said first version of said second module being transferred to said second version of said second module during said initialization phase, with resources managed by said first version of said second module being transferred to said second version of said second module upon their release during said relay phase, and with common data being transferred from said first version of said second module to said second version of said second module during said finalization phase.

12. The method of claim 11 for the selective replacement, testing and activation of modular software units in a telecommunications application program wherein the transfer of common data from said first version to said second version during said finalization phase is performed using a translation function.

13. In a modular telecommunications software development environment, a system for reducing the coupling between the modules of a software application program comprising:

means for creating a receiving program module, said receiving program module existing in at least a first version and a second version, said second version being a later version with respect to said first version;

means for creating an originating program module having at least a first output port and a second output port, wherein said first output port comprises computer program instructions for communicating data from said originating program module to said first version of said receiving program module, and wherein said second output port comprises computer program instructions for communicating data from said originating program module to said second version of said receiving program module;

means for linking at least said originating program module and a selected version of said receiving program module into a software application program; and wherein a particular signal having said data, a signal reference, and a version value corresponds to both said first output port and said second output port, said computer program instructions using said version value to determine whether to direct said data through said first output port to said first version of said receiving program module or through said second output port to said second version of said receiving program module.

14. In a modular telecommunications software development environment, a system for reducing the coupling between the modules of a software application program comprising:

means for creating a plurality of software program modules, including a first module having at least a first output port and a second output port, said first module invoking a second module during its operation, said second module existing in at least a first version and a second version, wherein said first output port comprises computer program instructions for communicating data from said first module to said first version of said second module, and wherein said second output port comprises computer program instructions for communicating data from said first module to said second version of said second module;

means for linking a selected group of two or more modules into a software application program;

means for providing at least one invocation of a nonlocal reference, said at least one invocation of a nonlocal reference associated with said data and a version value, said at least one invocation of a nonlocal reference corresponding to both said first output port and said second output port;

means for executing said software application program by processing said at least one invocation of a nonlocal reference in said first module through said first output port of said first module responsive to said version value pointing to said first version of said second module and through said second output port of said first module responsive to said version value pointing to said second version of said second module.

15. The system of claim 14 for reducing the coupling between the modules of a software application program wherein the communication of data between modules is performed using a message-passing protocol.

16. The system of claim 14 for reducing the coupling between the modules of a software application program wherein said means for linking a selected group of two or more modules into a software application program additionally comprises means for performing the linking at system design time.

17. The system of claim 14 for reducing the coupling between the modules of a software application program wherein said means for linking a selected group of two or more modules into a software application program additionally comprises means for performing the linking at system configuration time.

18. The system of claim 14 for reducing the coupling between the modules of a software application program wherein said means for linking a selected group of two or more modules into a software application program additionally comprises means for performing the linking dynamically at run-time.

19. In a telecommunications environment, a system for the selective replacement, testing and activation of modular software units in a telecommunications application program comprising:

means for creating a plurality of software program modules, including a first module having at least a first output port and a second output port, said first module invoking a second module during its operation, said second module existing in at least a first version and a second version, wherein said first output port comprises computer program instructions for communicating data from said first module to said first version of said second module, and wherein said second output port comprises computer program instructions for communicating data from said first module to said second version of said second module;

means for grouping the modules of a modular telecommunications application software into Access Modules, Service Modules and Resource Modules, said Access Module being responsible for managing a plurality of Access Individuals, said Service Module being responsible for managing a plurality of Service Individuals and said Resource Module being responsible for managing a plurality of Resource Individuals, each Access Individual corresponding to a different access channel and each Resource Individual associated with at least one resource for providing a telecommunications service, each Service Individual including control state and other information related to a particular instance of a telecommunications service, said other information including at least one reference to an associated Resource Individual;

means for assigning a unique Service Identity (SI) to each new service need identified by an Access Module;

means for specifying a unique local or global selection variable (SV) to indicate when the telecommunications application program is to make the transition from using said first version of said second module to using said second version of said second module;

means for comparing said Service Identity with said local or global selection variable;

means for relinking the modules of the telecommunications application program by replacing references to said first version of said second module with references to said second version of said second module if the Service Identity is greater than or equal to said local or global selection variable; and means for executing said software application program.

20. The system of claim 19 for the selective replacement, testing and activation of modular software units in a telecommunications application program wherein means for comparing said Service Identity with said local or global selection variable additionally comprises means for performing the comparison only in a configuration mode.

21. The system of claim 19 for the selective replacement, testing and activation of modular software units in a telecommunications application program additionally comprising a test mode wherein data is communicated from said first module to both the first version as well as the second version of said second module.

22. The system of claim 21 for the selective replacement, testing and activation of modular software units in a telecommunications application program wherein events associated with a selected Service Identity are traced and logged during said test mode.

23. The system of claim 19 for the selective replacement, testing and activation of modular software units in a telecommunications application program wherein the transition from using said first version of said second module to using said second version of said second module is performed in phases, and comprises an initialization phase, a relay phase and a finalization phase, with all unallocated resources belonging to said first version of said second module being transferred to said second version of said second module during said initialization phase, with resources managed by said first version of said second module being transferred to said second version of said second module upon their release during said relay phase, and with common data being transferred from said first version of said second module to said second version of said second module during said finalization phase.

24. The system of claim 23 for the selective replacement, testing and activation of modular software units in a telecommunications application program wherein means for the transfer of common data from said first version to said second version during said finalization phase additionally comprises a translator.

* * * * *